US008566391B2

(12) United States Patent
Saito et al.

(10) Patent No.: US 8,566,391 B2
(45) Date of Patent: Oct. 22, 2013

(54) SYSTEM AND METHOD FOR EVALUATING APPLICATION SUITABILITY IN EXECUTION ENVIRONMENT

(75) Inventors: Kota Saito, Kawasaki (JP); Akihiko Yamaguchi, Yokohama (JP); Atsushi Hatakeyama, Yokohama (JP); Nobuo Beniyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 750 days.

(21) Appl. No.: 12/672,704

(22) PCT Filed: Aug. 13, 2009

(86) PCT No.: PCT/JP2009/003893
§ 371 (c)(1),
(2), (4) Date: Feb. 9, 2010

(87) PCT Pub. No.: WO2011/018827
PCT Pub. Date: Feb. 17, 2011

(65) Prior Publication Data
US 2011/0270963 A1 Nov. 3, 2011

(51) Int. Cl.
*G06F 15/16* (2006.01)
*G06F 15/177* (2006.01)
*G06F 15/173* (2006.01)
*G06F 9/46* (2006.01)

(52) U.S. Cl.
USPC ........... 709/203; 709/219; 709/222; 709/224; 709/226; 718/104

(58) Field of Classification Search
USPC ................. 709/220–222, 203, 219, 224, 226; 718/104
See application file for complete search history.

(56) References Cited

U.S. PATENT DOCUMENTS

| 6,538,667 | B1 | 3/2003 | Duursma et al. |
| 7,146,607 | B2 * | 12/2006 | Nair et al. ................. 717/151 |
| 7,620,953 | B1 * | 11/2009 | Tene et al. ................. 718/104 |
| 8,219,987 | B1 * | 7/2012 | Vlaovic et al. ............... 718/1 |
| 2001/0013024 | A1 | 8/2001 | Takahashi et al. |
| 2002/0013833 | A1 * | 1/2002 | Wyatt et al. ................. 709/220 |
| 2006/0085789 | A1 | 4/2006 | Laborezfalvi et al. |
| 2006/0143715 | A1 * | 6/2006 | Chow et al. ................. 726/27 |
| 2008/0168163 | A1 | 7/2008 | Kurokawa |
| 2011/0270963 | A1 * | 11/2011 | Saito et al. ................. 709/224 |

FOREIGN PATENT DOCUMENTS

| JP | 06-243097 A | 9/1994 |
| JP | 2001-222424 A | 8/2001 |
| JP | 2003-505781 A | 2/2003 |
| JP | 2008-515103 A | 5/2008 |
| JP | 2008-129648 A | 6/2008 |
| JP | 2008-152591 A | 7/2008 |
| JP | 2008-269422 A | 11/2008 |

OTHER PUBLICATIONS

The International Search Report and Written Opinion of the corresponding application PCT/JP2009/003893, dated Aug. 13, 2009.
English Translation of Written Opinion, (Box No. V), dated Aug. 13, 2009.

* cited by examiner

*Primary Examiner* — Gregory Todd
(74) *Attorney, Agent, or Firm* — Foley & Lardner LLP

(57) ABSTRACT

An evaluation system evaluates the suitability of an application in a plurality of types of application execution environments based on the characteristics of this application and the usage of this application by a user. The evaluation system displays information denoting the result of this evaluation.

4 Claims, 33 Drawing Sheets

FIG. 6

| ID | APPLICATION NAME | VERSION | EXECUTION ENVIRONMENT |
|---|---|---|---|
| 1 | MAILER | Ver 0.8 | STANDARD |
| 2 | SSH CLIENT | Ver 1.2 | STANDARD |
| 3 | WEB BROWSER | Ver 3.0 | STANDARD |
| ... | ... | ... | ... |

FIG. 7

| APPLICATION ID | START TIME | END TIME |
|---|---|---|
| 2 | 2006/01/30 08:45 | 2006/01/30 17:30 |
| 1 | 2009/05/01 10:02 | 2009/05/01 10:30 |
| 1 | 2009/05/01 15:30 | 2009/05/01 16:20 |
| ... | ... | ... |

FIG. 8

| ID | APPLICATION NAME | VERSION | NUMBER OF PATCH RELEASES | SUPPORT OS |
|---|---|---|---|---|
| 1 | MAILER | Ver 0.8 | 5 | OS1, OS2, OS3 |
| 2 | SSH CLIENT | Ver 1.2 | 3 | OS1, OS2, OS3 |
| 3 | WEB BROWSER | Ver 3.0 | 20 | OS1, OS2, OS3 |
| 4 | DOCUMENT TOOL | Ver 1.0 | 3 | OS4 |
| ... | ... | ... | ... | ... |

FIG. 9

| APPLICATION ID | EXECUTION ENVIRONMENT | NUMBER OF USERS |
|---|---|---|
| 1 | STANDARD | 2000 |
| 2 | STANDARD | 20 |
| 3 | STANDARD | 2000 |
| 4 | STANDARD | 100 |
| ... | ... | ... |

FIG. 10

| EXECUTION ENVIRONMENT 1001 | CONVENIENCE 1002 | SECURITY 1003 | OPERATION COSTS 1004 | 214 |
|---|---|---|---|---|
| STANDARD | NUM ($OS = $SUPPORT OS @ APPLICATION CHARACTERISTICS TABLE IN @CLIENT LIST)/NUM (@CLIENT LIST) | min ($NUMBER OF PATCH RELEASES @ APPLICATION CHARACTERISTICS TABLE, 20) x min ($NUMBER OF USERS @ APPLICATION USAGE TABLE, 100) | min ($NUMBER OF USERS @ APPLICATION USAGE TABLE x 0.01 MAN-DAYS, 1 MAN-MONTHS) | |
| VIRTUAL | 1 | min ($NUMBER OF PATCH RELEASES @ APPLICATION CHARACTERISTICS TABLE, 20) | 0.01 MAN-DAYS | |

FIG. 11

| EVALUATION STANDPOINT | NORMALIZATION FORMULA |
|---|---|
| CONVENIENCE | 100 x $CONVENIENCE |
| SECURITY | 100 - $SECURITY/2000 |
| OPERATION COSTS | 100 - $OPERATION COSTS * 100/1 MAN-MONTHS |

FIG. 12

| APPLICATION ID | EXECUTION ENVIRONMENT | CONVENIENCE | SECURITY | OPERATION COSTS |
|---|---|---|---|---|
| 1 | STANDARD | 87 | 75 | 33 |
| 1 | VIRTUAL | 100 | 99 | 99 |
| 2 | STANDARD | 87 | 97 | 99 |
| 2 | VIRTUAL | 100 | 99 | 99 |
| 3 | STANDARD | 87 | 0 | 33 |
| 3 | VIRTUAL | 100 | 99 | 99 |
| 4 | STANDARD | 12 | 85 | 96 |
| 4 | VIRTUAL | 100 | 99 | 99 |
| ... | ... | ... | ... | ... |

FIG. 13

| APPLICATION ID | PRE-CHANGE | POST-CHANGE | CONVENIENCE | SECURITY | OPERATION COSTS |
|---|---|---|---|---|---|
| 1 | STANDARD | VIRTUAL | 13 | 24 | 66 |
| 2 | STANDARD | VIRTUAL | 13 | 2 | 0 |
| 3 | STANDARD | VIRTUAL | 13 | 99 | 66 |
| 4 | STANDARD | VIRTUAL | 88 | 13 | 3 |
| ... | ... | ... | ... | ... | ... |

FIG. 14

| EVALUATION STANDPOINT | PRIORITY |
|---|---|
| OPERATION COSTS | 3 |
| SECURITY | 2 |
| CONVENIENCE | 1 |

FIG. 15

| PRIORITY RANKING | APPLICATION ID | PRE-CHANGE | POST-CHANGE |
|---|---|---|---|
| 1 | 3 | STANDARD | VIRTUAL |
| 2 | 1 | STANDARD | VIRTUAL |
| 3 | 4 | STANDARD | VIRTUAL |
| 4 | 2 | STANDARD | VIRTUAL |
| ... | ... | ... | ... |

| HOST NAME | IP ADDRESS | OS |
|---|---|---|
| HOST0001 | 10.202.115.12 | OS3 |
| HOST0002 | 10.202.116.33 | OS2 |
| HOST0003 | 10.208.10.211 | OS3 |
| HOST0004 | 10.210.208.42 | OS4 |
| ... | ... | ... |
| HOST2400 | 10.205.13.6 | OS3 |

APPLICATION INFORMATION REGISTRATION SCREEN — 2400

- APPLICATION NAME : ☐ — 2401
- VERSION : ☐ — 2402
- NUMBER OF PATCH RELEASES : ☐ — 2403
- SUPPORT OS : ☐ — 2404

[REGISTER] — 2405

- LIST OF REGISTERED APPLICATIONS — 2406

| APPLICATION NAME | VERSION | NUMBER OF PATCH RELEASES | SUPPORT OS |
|---|---|---|---|
| MAILER | Ver. 0.8 | 5 | OS1, OS2, OS3 |
| SSH CLIENT | Ver. 1.2 | 3 | OS1, OS2, OS3 |
| WEB BROWSER | Ver. 3.0 | 20 | OS1, OS2, OS3 |
| DOCUMENT TOOL | Ver. 1.0 | 3 | OS4 |
| ... | ... | ... | ... |

FIG. 27

| APPLICATION ID (701) | START TIME (702) | END TIME (703) | NETWORK STATUS (704) |
|---|---|---|---|
| 2 | 2006/01/30 08:45 | 2006/01/30 17:30 | ONLINE |
| 1 | 2009/05/01 10:02 | 2009/05/01 10:30 | ONLINE |
| 1 | 2009/05/01 15:30 | 2009/05/01 16:20 | OFFLINE |
| ... | ... | ... | ... |

| APPLICATION ID (901) | EXECUTION ENVIRONMENT (902) | NUMBER OF USERS (903) | OFFLINE UTILIZATION RATE (904) |
|---|---|---|---|
| 1 | STANDARD | 2000 | 0 |
| 2 | STANDARD | 20 | 0 |
| 3 | STANDARD | 2000 | 0 |
| 4 | STANDARD | 100 | 0.30 |
| ... | ... | ... | ... |

| EXECUTION ENVIRONMENT 1001 | CONVENIENCE 1002 | SECURITY 1003 | OPERATION COSTS 1004 / 2914 |
|---|---|---|---|
| STANDARD | $OFFLINE UTILIZATION RATE @APPLICATION USAGE TABLE | min ($NUMBER OF PATCH RELEASES @APPLICATION CHARACTERISTICS TABLE, 20) x min ($NUMBER OF USERS @APPLICATION USAGE TABLE, 100) | min ($NUMBER OF USERS @APPLICATION USAGE TABLE x 0.01 MAN-DAYS, 1 MAN-MONTHS) |
| VIRTUAL | 0 | min ($NUMBER OF PATCH RELEASES @APPLICATION CHARACTERISTICS TABLE, 20) | 0.01 MAN-DAYS |

FIG. 30

| APPLICATION ID (1201) | EXECUTION ENVIRONMENT (1202) | CONVENIENCE (1203) | SECURITY (1204) | OPERATION COSTS (1205) |
|---|---|---|---|---|
| 1 | STANDARD | 0 | 75 | 33 |
| 1 | VIRTUAL | 0 | 99 | 99 |
| 2 | STANDARD | 0 | 97 | 99 |
| 2 | VIRTUAL | 0 | 99 | 99 |
| 3 | STANDARD | 0 | 0 | 33 |
| 3 | VIRTUAL | 0 | 99 | 99 |
| 4 | STANDARD | 30 | 85 | 96 |
| 4 | VIRTUAL | 0 | 99 | 99 |
| ... | ... | ... | ... | ... |

FIG. 31

| APPLICATION ID (1301) | PRE-CHANGE (1302) | POST-CHANGE (1303) | CONVENIENCE (1304) | SECURITY (1305) | OPERATION COSTS (1306) |
|---|---|---|---|---|---|
| 1 | STANDARD | VIRTUAL | 0 | 24 | 66 |
| 2 | STANDARD | VIRTUAL | 0 | 2 | 0 |
| 3 | STANDARD | VIRTUAL | 0 | 90 | 66 |
| 4 | STANDARD | VIRTUAL | -30 | 13 | 3 |
| ... | ... | ... | ... | ... | ... |

FIG. 32

| PRIORITY RANKING | APPLICATION ID | PRE-CHANGE | POST-CHANGE |
|---|---|---|---|
| 1 | 3 | STANDARD | VIRTUAL |
| 2 | 1 | STANDARD | VIRTUAL |
| 3 | 2 | STANDARD | VIRTUAL |
| 4 | 4 | STANDARD | VIRTUAL |
| ... | ... | ... | ... |

FIG. 34

| APPLICATION ID | STANDARD | VIRTUAL |
|---|---|---|
| 1 | 10,000 YEN/1 CORE | 50,000 YEN/1000 CO-USERS |
| 2 | 0 YEN | 0 YEN |
| 3 | 0 YEN | 0 YEN |
| 4 | 30,000 YEN/1 CORE | 50,000 YEN/1000 CO-USERS |
| ... | ... | ... |

FIG. 36

| APPLICATION ID | EXECUTION ENVIRONMENT | NUMBER OF USERS | UTILIZATION RATE |
|---|---|---|---|
| 1 | STANDARD | 2000 | 0.54 |
| 2 | STANDARD | 20 | 0.30 |
| 3 | STANDARD | 2000 | 0.10 |
| 4 | STANDARD | 100 | 0.40 |
| ... | ... | ... | ... |

FIG. 37

| EXECUTION ENVIRONMENT 1001 | CONVENIENCE 1002 | SECURITY 1003 | OPERATION COSTS 1004 |
|---|---|---|---|
| STANDARD | 100 | 100 | $STANDARD @ BILLING INFORMATION TABLE × $NUMBER OF USERS @ APPLICATION USAGE TABLE |
| CLOUD A | $UTILIZATION RATE @ APPLICATION USAGE TABLE? LESS THAN 0.10 → 100, LESS THAN 0.20 → 50, LESS THAN 0.30 → 20 EQUAL TO OR MORE THAN 0.30 → 0 | 80 | $CLOUD A @ BILLING INFORMAITON TABLE × $NUMBER OF USERS @ APPLICATION USAGE TABLE |
| CLOUD B | $UTILIZATION RATE @ APPLICATION USAGE TABLE? LESS THAN 0.20 → 100, LESS THAN 0.35 → 50, LESS THAN 0.50 → 20, EQUAL TO OR MORE THAN 0.50 → 0 | 90 | $CLOUD B @ BILLING INFORMATION TABLE × $NUMBER OF USERS @ APPLICATION USAGE TABLE |

| EXECUTION ENVIRONMENT (3901) | CONDITION FORMULA (3902) | 225 |
|---|---|---|
| STANDARD | NUMBER OF USERS < 1000 | |
| VIRTUAL | VIRTUALIZABLE & NUMBER OF USERS > 1000 & LAST UTILIZATION TIME < 6 MONTHS AGO & NO RELATED APPLICATION | |

SYSTEM AND METHOD FOR EVALUATING APPLICATION SUITABILITY IN EXECUTION ENVIRONMENT

TECHNICAL FIELD

The present invention relates to technology for carrying out evaluation using a computer.

BACKGROUND ART

In order to maintain the security level and achieve thorough compliance (for example, strictly legitimate use of purchased software) in an enterprise system, the operations administrator of the enterprise system (referred to simply as the "administrator" hereinafter) is required to appropriately manage an application installed on the client terminal (called the "client" hereinbelow) used by an individual (called the "user" hereinbelow) inside the enterprise. The technology disclosed in Patent Literature 1, for example, is known as a technology that meets such needs. According to Patent Literature 1, an operation management device collects and uniformly manages application-related information from the client, and carries out a security check and a license check. Meanwhile, the environment of the enterprise system client has become increasingly diverse in recent years, and the costs required to manage client resources continue to rise. As a technology for solving this problem, attention is focusing on application virtualization technology, which realizes cost reduction by virtue of a server centrally managing the application. The administrator may migrate an application to an environment that has implemented application virtualization technology (called the "virtual environment" hereinbelow).

"Application virtualization technology" is technology that makes it possible to use an application independent of a client-specific environment (for example, a device and/or operating system (called the "OS" hereinbelow) of the client). The following two methods are used to realize application virtualization technology.

A first method is one which executes an application that has been delivered from an application server in a client environment, which isolates access by the application to a native resource provided by the OS. A method of this type, for example, is disclosed in Patent Literature 2. This type method will be called the "streaming type" hereinafter.

A second method is one in which the client remotely executes the application on an application server. A method of this type, for example, is disclosed in Patent Literature 3. This type method will be called the "host type" hereinafter.

CITATION LIST

Patent Literature

PTL 1
Japanese Patent Application Laid-open No. 2001-222424
PTL 2
Japanese Translation of PCT Application No. 2008-515103
PTL 3
Japanese Translation of PCT Application No. 2003-505781

SUMMARY OF INVENTION

Technical Problem

Not all applications are suited to a virtual environment because the cost-merits of migrating an application to a virtual environment are not always obtainable, user convenience is sometimes lost, and, in addition, there are technological issues. For example, there are cases in which an environment in which the application is installed in the client (called the "physical environment" hereinbelow) is more suitable. In the technology described in Patent Literature 1, it is not possible to determine the appropriate execution environment for the application.

Therefore, an object of the present invention is to make it possible to select the appropriate application execution environment.

Solution to Problem

An evaluation system evaluates the suitability of an application in a plurality of types of application execution environments based on the characteristics of the application and/or the usage of which the application by the user. The evaluation system displays information denoting the result of this evaluation.

As used here, "application execution environment" refers to an environment in which an application is executed so that the client user is able to utilize the application. As an application execution environment, for example, there is a physical environment, one or more virtual environments, and one or more cloud environments (an environment in which a client utilizes an application function provided by a cloud system). As the one or more virtual environments, for example, there is a streaming-type virtual environment and a host-type virtual environment. No distinction is made as to where the application is actually executed. For example, in a case where the application execution environment is either a physical environment or a streaming-type virtual environment, the application is executed on the client. Further, in a case where the application execution environment is a host-type virtual environment, for example, the application is executed on an application server. And in a case where the application execution environment is a cloud environment, the application is executed in a cloud system.

Further, "displays information" may include the evaluation system sending information to a remote display device. In accordance with this, the remote display device displays information received from the evaluation system.

Advantageous Effects of Invention

According to the present invention, it is possible to select an appropriate application execution environment.

BRIEF DESCRIPTION OF DRAWINGS

FIG. 6 is a diagram showing an inventory table 418 related to the first embodiment.

FIG. 7 is a diagram showing a utilization log table 419 related to the first embodiment.

FIG. 8 is a diagram showing a characteristics table 211 related to the first embodiment.

FIG. 9 is a diagram showing a usage table 212 related to the first embodiment.

FIG. 10 is a diagram showing an evaluation formula table 214 related to the first embodiment.

FIG. 11 is a diagram showing a normalization formula table 215 related to the first embodiment.

FIG. 12 is a diagram showing a suitability evaluation table 216 related to the first embodiment.

FIG. 13 is a diagram showing an effect evaluation table 217 related to the first embodiment.

FIG. 14 is a diagram showing an evaluation standpoint priority table 219 related to the first embodiment.

FIG. 15 is a diagram showing a change priority ranking table 220 related to the first embodiment.

FIG. 16 is a diagram showing client list table 221 related to the first embodiment.

FIG. 24 is a diagram showing an application information registration screen 2400 related to the first embodiment.

FIG. 27 is a diagram showing a utilization log table 2601 related to the second embodiment.

FIG. 28 is a diagram showing a usage table 2612 related to the second embodiment.

FIG. 29 is a diagram showing an evaluation formula table 2914 related to the second embodiment.

FIG. 30 is a diagram showing a suitability evaluation table 3016 related to the second embodiment.

FIG. 31 is a diagram showing an effect evaluation table 3117 related to the second embodiment.

FIG. 32 is a diagram showing a change priority ranking table 3220 related to the second embodiment.

FIG. 34 is a diagram showing a billing information table 224 related to a third embodiment.

FIG. 36 is a diagram showing a usage table 3612 related to the fourth embodiment.

FIG. 37 is a diagram showing an evaluation formula table 3714 related to the fourth embodiment.

FIG. 39 is a diagram showing a threshold table 225 related to a sixth embodiment.

DESCRIPTION OF EMBODIMENTS

Figure 1:
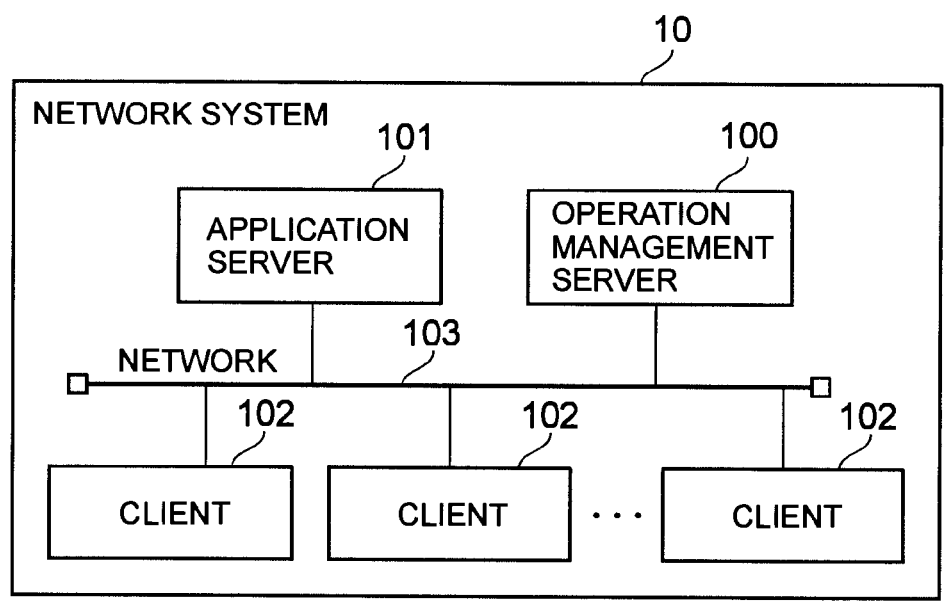
FIG. 1 is a diagram showing the overall configuration of a first embodiment.

A number of embodiments of the present invention will be explained below by referring to the drawings.

Furthermore, in the following explanation, various information will be explained using the expression "xxx table", but the various information may be expressed using a data structure other than a table. To show that the information is not dependent on the data structure, "xxx table" may be called "xxx information".

Further, when an information element included in the various information is explained, the identification information may be denoted using expressions such as "name" and "ID", but any type of identification information may be used, and the various types of identification information are interchangeable with other types of identification information.

Further, in the following explanation, there may be instances when processing is explained using a "program" as the subject, but since a prescribed process is carried out by the processor executing a program while using a storage resource (for example, a memory) and a communication control device (for example, a communication port) as needed, the processor may also be used as the subject of the processing. Further, processing that is explained having the program as the subject may be processing that is performed by a management system. Either all or a portion of the programs may be realized using dedicated hardware. For this reason, processing that is explained having a program as the subject may also be processing that is performed by a controller. The controller may comprise a processor and a storage resource that stores the computer program executed by the processor, and may comprise the above-mentioned dedicated hardware. Further, the computer program may be installed in respective computers from a program source. The program source, for example, may be either a program delivery server or a storage medium.

Furthermore, the management system is one or more computers, for example, either a management computer or a combination of a management computer and a computer for display use. Specifically, for example, in a case where a management computer displays display information, the management computer is the management system. Further, the same functions as those of the management computer may also be realized using a plurality of computers to increase processing speed and reliability, and, in this case, the relevant plurality of computers (may include a display computer in a case where a display computer carries out display) are the management system.

[Embodiment 1]

A first embodiment of the present invention will be explained.

The first embodiment relates to a network system in which a physical environment and a streaming-type virtual environment coexist. This network system is based on technology, which isolates an access by an application to a specific information resource that comprises setting information (for example, a registry) and an execution library (for example, a DLL (Dynamic Link Library). This network system comprises an application server, and this application server delivers a virtual application, which will be described hereinbelow, to a client.

[Overall Configuration]

FIG. 1 is a diagram showing the overall configuration of this embodiment.

A network system 10 comprises a management server 100, an application server 101, and one or more clients 102, and these components are coupled to a network 103.

The network 103 is a communication network for communicably coupling together the management server 100, the application server 101 and the client group. The network 103, for example, may be a LAN (Local Area Network) or a WAN (Wide Area Network).

The application server 101 is one or more computers, and delivers an application to a client 102 in response to a request from this client 102.

The client 102 is an information processing terminal (for example, a desktop PC (Personal Computer) or a notebook PC), and is utilized by a user (for example, an employee of an enterprise). The client 102 is able to receive and execute an application from the application server 101.

In this embodiment, an application utilized by the user of the client 102 may be a physical application or a virtual application. The physical application is an application that is installed on the client 102, and depends on the client-specific environment (for example, the device and/or OS). The virtual application is a package (an archive) comprising an execution program and a specified information resource that comprises setting information (for example, a registry) and an execution library (for example, a DLL (Dynamic Link Library)), and is not dependent of the client specific environment. Hereinafter, the physical application and the virtual application will be referred to generically as the "application".

The management server 100 is one example of a management system to which is applied an evaluation system that conforms to an embodiment of the present invention. The management server 100 collects information denoting the characteristics of an application that is utilized on the network system 10 and the usage thereof, and uniformly manages this information. Details will be explained hereinbelow.

[Management Server Configuration]

Figure 2:
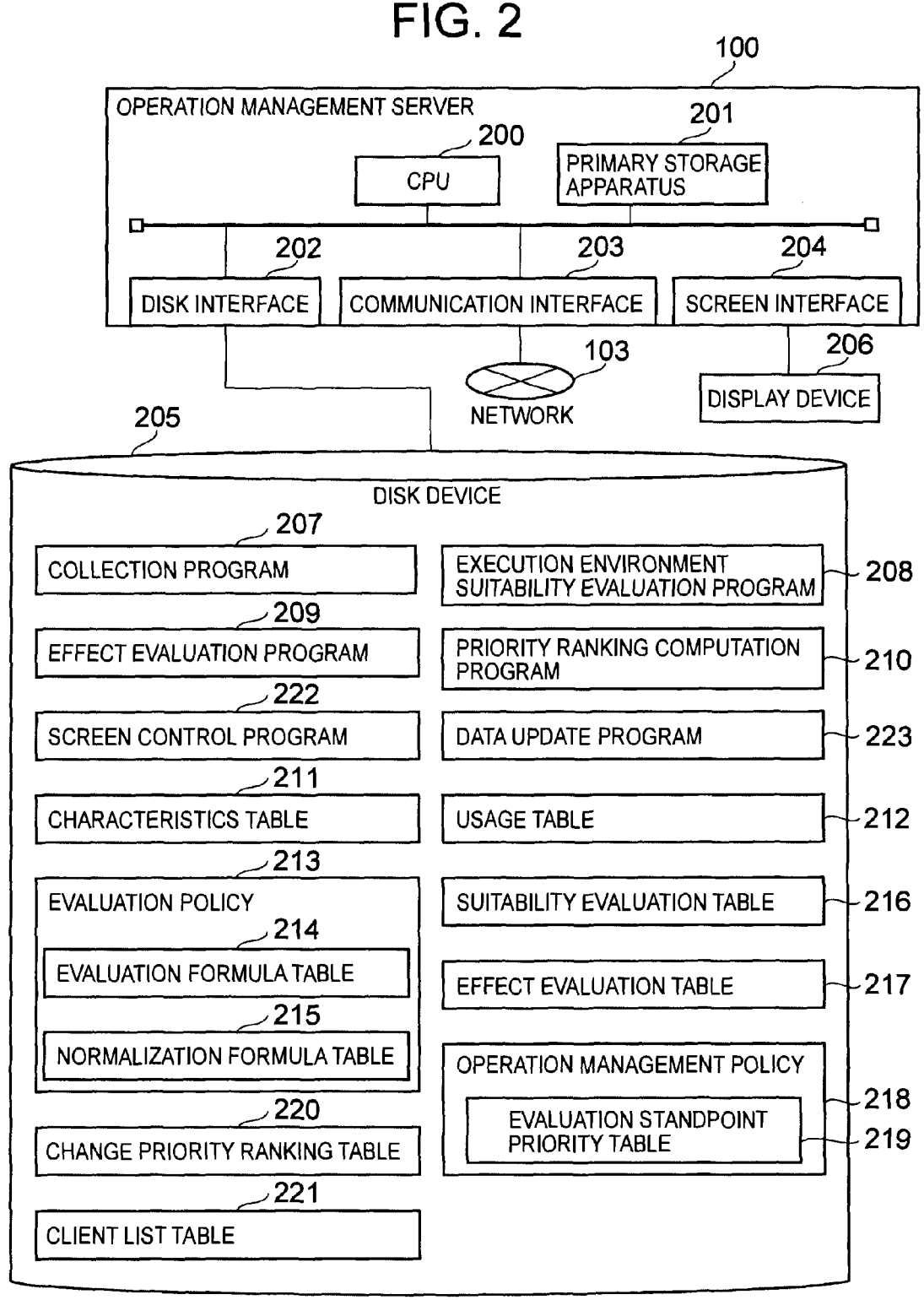
FIG. 2 is a diagram showing the configuration of a management server 100 related to the first embodiment.

FIG. 2 is a diagram showing the configuration of the management server 100.

The management server 100 comprises a communication interface 203 and a controller, and the controller comprises a CPU (Central Processing Unit) 200, a primary storage device (for example, a memory) 201, a disk interface 202, and a screen interface 204. The communication interface 203 is coupled to the network 103, the disk interface 202 is coupled to a disk device 205, and the screen interface 204 is coupled to a display device 206.

The display device 206 comprises a display screen (a LCD (Liquid Crystal Display) screen), and displays information outputted from the management server 100 (for example, client information, application information, and information related to the priority of an application for which the execution environment is changed and the effect resulting from the change).

The disk device 205 is a storage device, and may be built into the management server 100, or may be a large-capacity disk array device. The "disk device" storage medium referred to in this specification is a hard disk or other such disk, and another type of storage medium, such as a flash memory, may also be used. The disk device 205 stores data and a program used by the management server 100. The disk device 205, for example, stores a collection program 207, a suitability evaluation program 208, an effect evaluation program 209, a priority ranking calculation program 210, a screen control program 222, a data update program 223, a characteristics table 211, a usage table 212, an evaluation policy 213, a suitability evaluation table 216, an effect evaluation table 217, an operation management policy 218, a change priority ranking table 220, and a client list table 221. The programs stored in the disk device 205 are loaded into the primary storage device 201 and executed by the CPU 200.

The characteristics table 211 is for storing information denoting the characteristics of respective applications. As used here, "application characteristic", for example, is a property specific to the application, specifically, for example, a version, support OS or the like.

The usage table 212 is for storing information denoting the usage by the users of the respective applications. As used here, "information denoting the usage", for example, refers to information that may change in accordance with the way the application is utilized, specifically, for example, the number of application users and the utilization history.

The evaluation policy 213 is information denoting a policy for evaluating the suitability of an application in respective execution environments from an operational management standpoint. The evaluation policy 213, for example, comprises an evaluation formula table 214 and a normalization formula table 215. The suitability of an application in a certain execution environment denotes how appropriate using this application in this execution environment is. For example, from the aspect of the costs required for operational management, such as security checks, a virtual environment is more appropriate than a physical environment for an execution environment of an application that has a large number of users. In this embodiment, the suitability of an application in a certain execution environment is evaluated from the three operational management evaluation standpoints of security, operating costs, and user convenience.

The evaluation formula table 214 stores a formula for quantitatively evaluating and calculating the suitability of an application in a certain execution environment.

The normalization formula table 215 stores a formula for arranging a range of values calculated in accordance with respective formulas of the evaluation formula table 214.

The suitability evaluation table 216 stores information denoting the result of an application suitability evaluation.

The effect evaluation table 217 stores information denoting the result of an evaluation of the effect of changing the execution environment of an application.

The operation management policy 218 is information denoting operational management guidelines for evaluating application suitability and determining the change priority of an execution environment. The operation management policy 218 comprises an evaluation standpoint priority table 219.

The evaluation standpoint priority table 219 stores information denoting the standpoint to be emphasized when calculating the priority ranking for changing an execution environment. In this embodiment, information denoting the priority of an operational management evaluation standpoint is stored in table 219.

The change priority ranking table 220 stores information denoting the priority ranking of an application that is targeted for an execution environment change.

The client list table 221 stores information related to all the clients 102 in the network system 10.

The collection program 207 collects information on an application that is being used by a client group from a client 102 agent program 407, which will be described hereinbelow, and stores the collected information in the usage table 212.

The suitability evaluation program 208 evaluates the suitability of an application in the respective application execution environments based on the characteristics table 211, the usage table 212 and the evaluation policy 213, and stores information showing the result of this evaluation in the suitability evaluation table 216.

The effect evaluation program 209 evaluates the effect of changing the application execution environment based on the suitability evaluation table 216, and stores information showing the result of this evaluation in the effect evaluation table 217.

The priority ranking calculation program 210 calculates the priority ranking of an application targeted for an execution environment change based on the effect evaluation table 217 and the operation management policy 218, and stores the calculated priority ranking in the change priority ranking table 220.

The screen control program 222 formats screen information to be displayed on the display device 206, and updates a display screen upon receiving a network system 10 administrator operation. In this embodiment, the screens that the screen control program 222 displays on the display device 206, for example, include a priority ranking list screen 2200 explained using FIG. 22, an operation management policy setting screen 2300 explained using FIG. 23, and an application information registration screen 2400 explained using FIG. 24.

The data update program 23 updates the various tables maintained by the management server 100. The data update program 223 executes in order the collection program 207, the suitability evaluation program 208, the effect evaluation program 209, and the priority ranking calculation program 210, collects inventory information (for example, information denoting an application name, version, and execution environment) from all the clients, evaluates the application suitability, and calculates the priority ranking. Furthermore, the execution of the data update program 223 may be triggered by pressing the update button 2205 of the priority ranking list screen 2200 that will be explained using FIG. 22. Further, the management server 100 may execute the data update program 223 on a regular basis.

[Application Server Configuration]

Figure 3:
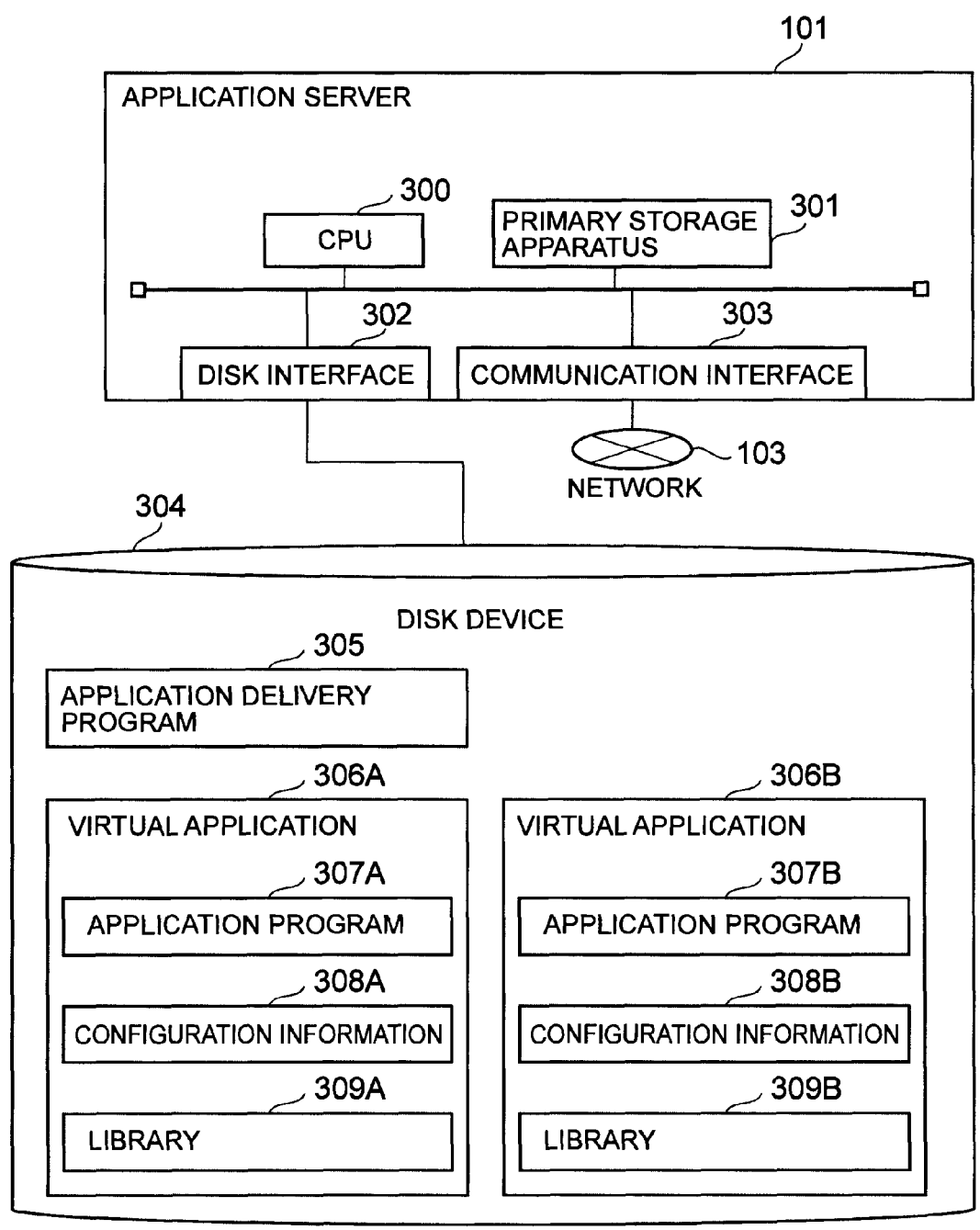
FIG. 3 is a diagram showing the configuration of an application server 101 related to the first embodiment.

FIG. 3 is a diagram showing the configuration of the application server 101.

The application server 101 comprises a communication interface 303 and a controller, and the controller comprises a CPU 300, a primary storage device (for example, a memory) 301, and a disk interface 302. A disk device 304 is coupled to the disk interface 302, and the network 103 is coupled to the communication interface 303.

The disk device 304 is a storage device for storing a program and data utilized by the application server 101, and may be built into the application server 101. The disk device 304 stores an application delivery program 305, and a virtual application group that is managed by the application server 101. The virtual application group comprises virtual applications 306A and 306B. The virtual applications included in the virtual application group are not limited to two applications, and may be one, or three or more. Virtual application 306A will be representatively explained. The program stored in the disk device 304 is loaded into the primary storage device 301 and executed by the CPU 300.

The virtual application 306A is a package (an archive) comprising an application program 307A, and configuration information 308A and a library 309A that are used by the application program 307A. The virtual application 306A comprises both the setting information 308A and the library 309A, but the present invention is also applicable for a virtual application that does not have either one or both of these. Further, the virtual application may comprise information other that configuration information and a library. Furthermore, the virtual application may be registered by the administrator, or may be registered by the management server 100.

The application program 307A is the main program of the application, and, for example, is an application execution file. The application program 307A may also be a program for installing the application.

The configuration information 308A is information used at application program 307A execution, and, for example, is a registry and/or a configuration file.

The library 309A is information used as a library an application execution, and, for example, is a DLL (Dynamic Link Library).

The virtual application 306B is the same as the virtual application 306A.

The application delivery program 305, in response to a request from a client 102, delivers the application server 101-managed virtual application to this client 102 via the network 103. The application delivery program 305 may also comprise a function other than the delivery function, for example, an access control function for restricting access from the client 102, and/or a log management function for storing an access log of a client 102.

The application delivery program 305, which is read into the primary storage device 301, delivers a virtual application to a client 102 in response to a request from this client 102 in accordance with the CPU 300 executing the application delivery program 305.

[Client Configuration]

Figure 4:
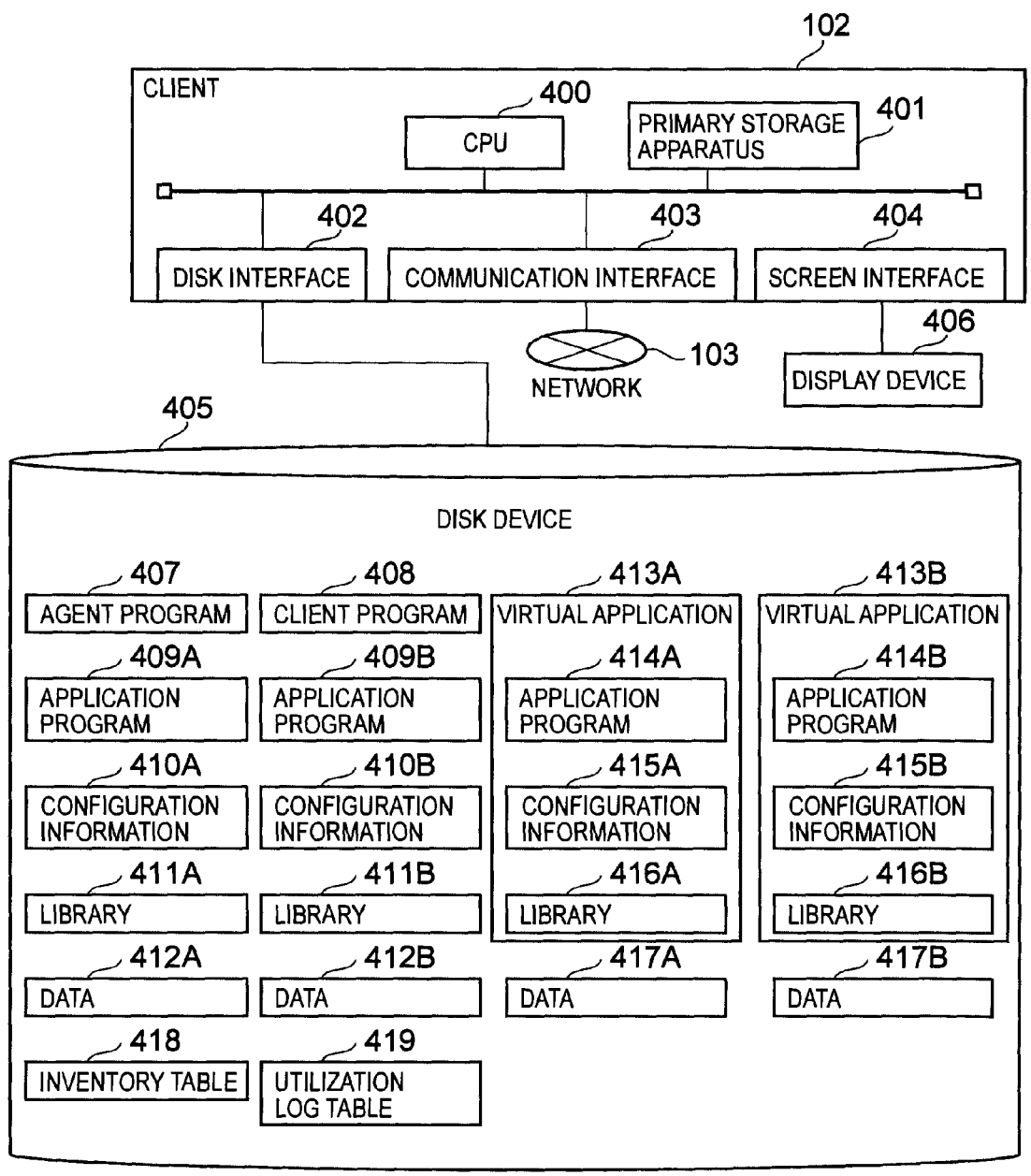
FIG. 4 is a diagram showing the configuration of a client 102 related to the first embodiment.

FIG. 4 is a diagram showing the configuration of the client 102.

The client 102 comprises a communication interface 403 and a controller, and the controller comprises a CPU 400, a primary storage device 401, a disk interface 402, and a screen interface 404. A disk device 405 is coupled to the disk interface 402, the network 103 is coupled to the communication interface 403, and a display device 406 is coupled to the screen interface 404.

The display device 406 is a device comprising a display screen, such as an LCD screen, and displays information outputted from the client 102 (for example, information for a user to utilize the client 1020S and application).

The disk device 405 is a storage device for storing a program and data utilized by the client 102, and may be built into the client 102. The disk device 405 stores an agent program 407, a client program 408, an application program 409A, configuration information 410A, a library 411A and data 412A that are used by the application program 409A, an application program 409B, configuration information 410B, a library 411B and data 412B that are used by the application program 409B, a virtual application 413A, a virtual application 413B, data 417A used by the virtual application 413A, data 417B used by the virtual application 413B, an inventory table 418, and a utilization log table 419.

The application program 409A is a physical application that is installed in the client 102, and is the main program of the application, such as an execution file.

The configuration information 410A is a registry or configuration file that the application program 409A uses at execution.

The library 411A is a library such as a DLL, which the application program 409A reads in at execution.

The data 412A is a file or the like that the application program 409A outputs as a processing result. Further, the data 412A may be a file that is inputted for the application program 409A to process.

The application program 409B, the configuration information 410B, the library 411B and the data 412B are respectively the same as the application program 409A, the configuration information 410A, the library 411A and the data 412A.

In this embodiment, the data 412A is a single configuration, and is also applicable to an application in which a plurality of data exists for each document, as with a document tool.

The virtual application 413A is a virtual application that the client 102 has received from the application server 101. As was explained using FIG. 3, the virtual application 413 comprises an application program 414A, configuration information 415A, and a library 416A.

The virtual application 413B is also a virtual application that the client 102 has received from the application server 101, the same the virtual application 413A.

The data 417A is a file or the like that the virtual application 413A outputs as a processing result. Further, the data 417A may be a file that is inputted to be processed by the virtual application 413A. Also, in this embodiment, the configuration is such that the data 417A is not included in the virtual application 413A, but the configuration may also be such that the data 417A is included in the virtual application 413A.

The data 417B is a file or the like that constitutes the input or output of the processing of the virtual application 413B the same as the data 417A.

The inventory table 418 stores information (for example, a name or version) related to the application being utilized on the client 102.

The utilization log table 419 stores the utilization log of an application (for example, the application execution time).

The agent program 407 is for collecting information and a utilization log of an application. Further, as was explained using FIG. 2, the agent program 407 is called from the collection program 207 of the management server 100, and returns the collected information to the management server 100.

The client program 408 is for executing a virtual application, and is executed on the OS (not shown in the drawing) of the client 102. The client program 408 is able to execute the virtual application 413A (413B) independent of the client-specific environment (for example, the OS) because it conceals the OS from the application program 414A (414B) inside the virtual application 413A (413B). The application program 414A (414B) runs by using the archived configuration information 415A (415B) and library 416A (416B). Furthermore, the present invention is also applicable to a case in which the application program inside the virtual application does not make use of the configuration information and/or the library, and to a case in which the application program inside the virtual application makes use of other information. In addition, the present invention is also applicable to a case in which the client program 408 is included in the virtual application, and to a case in which the client program 408 is a program (for example, a Web browser) that is built into the OS as standard. Furthermore, since the virtual application is executed independent of the environment specific to the client, the client 1020S is able to execute the virtual application even in a case where the OS is not supported by the application program (414A, 414B). Further, it is also possible to execute a different version of the same application on the same client, and to execute an application without competing with another application.

Furthermore, it is also possible for the virtual application to be forcibly acquired from the application server 101a second time after having been acquired one time from the application server 101. This is a function, which is used when synchronizing with a virtual application that has been delivered to the client in a case where a security patch or the like has been applied to an application server 101-managed virtual application, and makes it possible to maintain the overall security level of the network system 10.

[Overview of First Embodiment]

Figure 5:
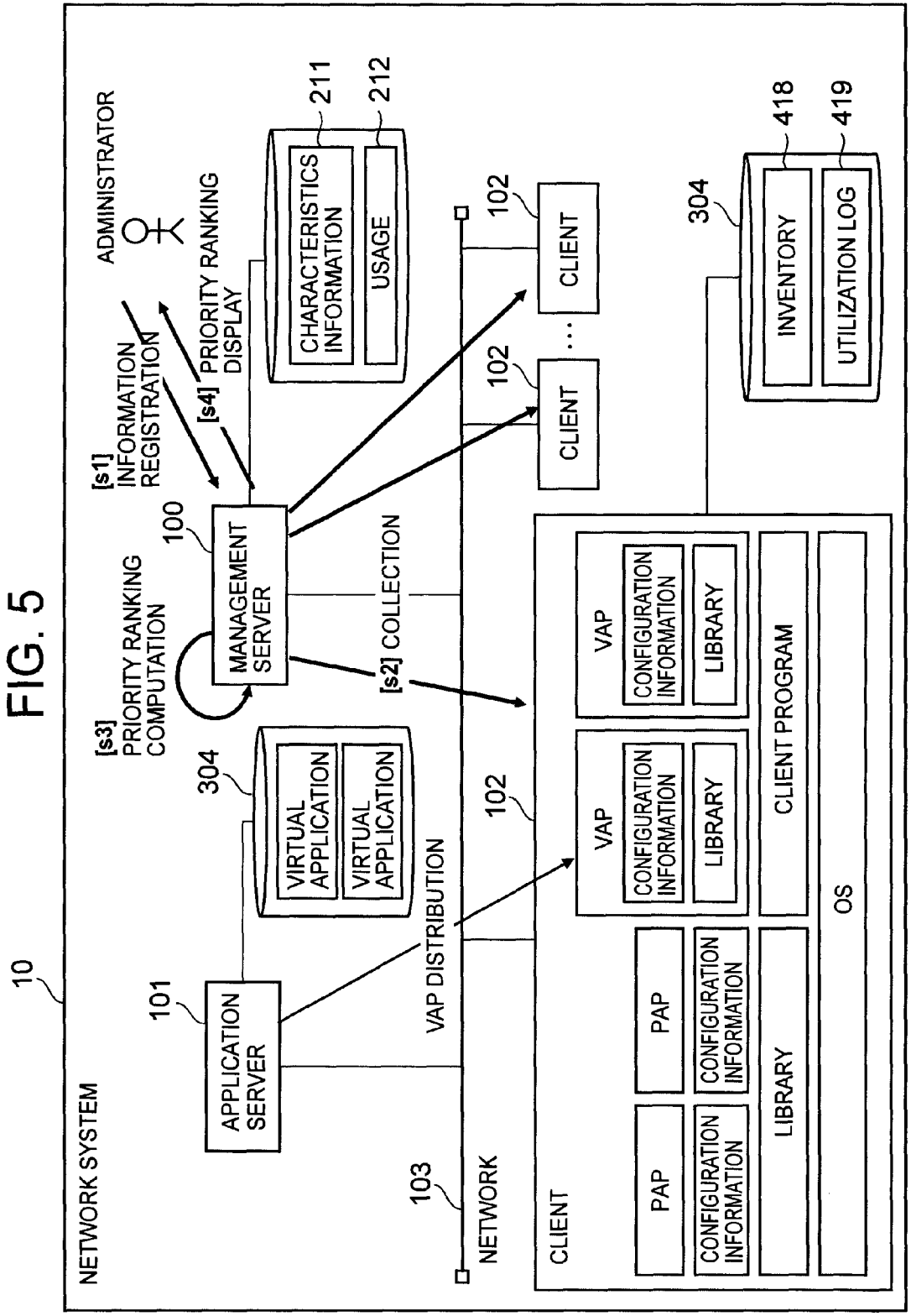
FIG. 5 is a diagram illustrating an overview of the first embodiment.

FIG. 5 is a diagram showing an overview of this embodiment. Furthermore, in FIG. 5, the virtual application is abbreviated as "VAP" and the physical application is abbreviated as "PAP".

First of all, the administrator registers information related to an application from an application information registration screen 2400, which will be explained using FIG. 24. The management server 100 updates the characteristics table 211 based on the registered information (Step s1).

Next, the management server 100 collects the information stored in the inventory table 418 and the information stored in the utilization log table 419 from all the clients of the network system 10, and updates the usage table 212 on the basis of this collected information (Step s2).

Next, the management server 100 evaluates the characteristics of the application in the respective execution environments based on the characteristics table 211 and the usage table 212, and calculates the application priority ranking for changing the execution environment (Step s3).

Next, the management server 100 displays the calculated priority ranking and the effect of changing the execution environment on the screen (Step s4).

The administrator decides the application for which the execution environment is to be changed based on the priority ranking and the effect of an execution environment change displayed on the screen in Step s4.

[Configurations of Various Tables of the Client 102]

FIG. 6 is a diagram showing the inventory table 418.

Each row of the inventory table 418 comprises an ID 601, an application name 602, a version 603, and an execution environment 604, and corresponds to one application used on the client 102.

The ID 601 is information (for example, a numeric value and/or a character string) for uniquely identifying the application being used on the client 102.

The application name 602 is information denoting the name of the application.

The version 603 is information denoting the version of the application.

The execution environment 604 is information denoting the execution environment of the application. In a case where the application execution environment is the physical environment (in other words, in a case where the application is a physical application), "standard" is set as the execution environment 604. In a case where the application execution environment is the virtual environment (in other words, a case where the application is a virtual application), "virtual" is set as the execution environment 604.

Furthermore, the virtual environment in this embodiment is the streaming-type virtual environment, but in a case where the host-type virtual environment is also possible in the network system 10 (that is, a case in which this embodiment and the below-described second embodiment have been combined), a value that makes it possible to distinguish between the types of virtual environments, such as "virtual (streaming)" and "virtual (host)" is stored as the execution environment 604. Further, in a case where an environment other than the physical environment and virtual environment, for example, the below-described cloud environment, is possible in the network system 10 (a case in which this embodiment and the fourth embodiment have been combined), the value "cloud", which denotes the cloud environment, is stored as the execution environment 604. In addition, in a case where a plurality of cloud environments exist, a value that makes it possible to distinguish between the cloud environments, such as "cloud A" and "cloud B", is stored as the execution environment 604.

Further, the various types of information of the inventory table 418, for example, may be acquired and set using a program that is built into the OS as standard so as to acquire installed application list information and file list information.

FIG. 7 is a diagram showing the utilization log table 419.

Each row of the utilization log table 419 comprises an application ID 701, a start time 702, and an end time 703, and corresponds to a single application to be utilized on the client 102.

The application ID 701 is information for uniquely identifying an application to be used on the client 102, and specifically, for example, is the same value as the value of the ID 601 of the inventory table 418.

The start time 702 is information denoting the time at which application utilization started.

The end time 703 is information denoting the time at which application utilization ended.

Furthermore, the various information of the application log table 419, for example, may be acquired and set from the client program 408 or a program that is built into the OS as standard so as to monitor the status of the execution process. [Configurations of Various Tables of the Management Server 100]

FIG. 8 is a diagram showing the characteristics table 211.

Each row of the characteristics table 211 comprises an ID 801, an application name 802, a version 803, a number of patches 804, and a support OS 805, and corresponds to a single application to be utilized on the network system 10.

The ID 801 is information for uniquely specifying the application to be utilized on the network system 10.

The application name 802 is information denoting the name of the application.

The version 803 is information denoting the version of the application.

The number of patches 804 is information denoting the number of times that a modified program (called a "patch" hereinbelow) has been released for updating the application program. In a case where the application version 803 changes in line with the release of a patch, a new row is added to the characteristics table 211. A value obtained by adding 1 to the original number of patches 804 is stored as the number of patches 804 to be stored in the row that has been added.

The support OS 805 is information denoting the OS (support OS) on which the application guarantees its operation. In a case where a plurality of support OS exist, information denoting the plurality of support OS (for example, a character string linked together by comma delimiters) is stored in a single row. Furthermore, in this embodiment, the character string denoting the support OS is linked together by comma delimiters, but it is also possible to use a method that manages the support OS 805 in a different table, and normalizes the table.

In this embodiment, the information, which is stored in the characteristics table 211, is inputted from the administrator via an application information registration screen 2400 that will be explained using FIG. 24. However, the present invention is not limited to this, and, for example, the information that is stored in the characteristics table 211 may be acquired from the application, may be acquired from the various types of files packaged in the application execution file or the like, may be provided from outside of the network system 10 (for example, a service of the application vendor or another organization), and may be incorporated in the management server 100.

FIG. 9 is a diagram showing the usage table 212.

Each row of the usage table 212 comprises an application ID 901, an execution environment 902, and a number of users 903, and corresponds to a single application to be used on the network system 10.

The application ID 901 is information for uniquely specifying the application to be used on the network system 10, and specifically, for example, is the same value as the value of the ID 801 in the characteristics table 211 explained using FIG. 8.

The execution environment 902 is information denoting the execution environment of the application. The types of values stored as the execution environment 902 are the same as those of the execution environment 604 of the inventory table 418 of FIG. 6.

The number of users 903 is information denoting the number of users who are utilizing the same application on the network system 10. The number of users 903, specifically, for example, is the number of same information sets included in the information collected from all of the clients 102. As used here, an information set is a combination of the application name 602, the version 603 and the execution environment 604.

FIG. 10 is a diagram showing the evaluation formula table 214.

Each row of the evaluation formula table 214 comprises an execution environment 1001, a convenience 1002, a security 1003, and an operation cost 1004, and corresponds to a single execution environment.

The execution environment 1001 is information denoting the execution environment of the application. The types of values stored as the execution environment 1001 are the same as those of the execution environment 604 of the inventory table 418 of FIG. 6.

The convenience 1002, the security 1003, and the operation cost 1004 are respective evaluation formulas for evaluating the suitability of an application in the application execution environment denoted by the execution environment 1001. At least one of the convenience 1002, the security 1003, and the operation cost 1004 may be a different type of information than the evaluation formula.

The convenience 1002 is an evaluation formula that has been prepared from the standpoint of the convenience of the user who is using the application. The "$support OS@characteristics table" in the drawing denotes that the value of the support OS 805 of the characteristics table 211 is set, and the "NUM ($OS=$support OS@characteristics table in@client list)/NUM (@client list)" denotes the percentage of the number of clients, of the total number of clients, that comprise an OS corresponding to the support OS (whether or not the client comprises an OS corresponding to the support OS may be specified from the OS 1603 of the below-described client list table 221). In this way, it is possible to carry out evaluation according to application characteristics and user usage by included information of the characteristics table 211 and the usage table 212 as evaluation formula input. Further, as the convenience 1002, a value of a table or column other than the ones described above may be inputted, a combination of these may be inputted, or a fixed value may be inputted. Further, in a case where at least one of the user convenience, the security, or the operation cost differs in accordance with the execution environment, a value that comprises an evaluation formula or a fixed value that is a function of the execution environment may be set instead of the application characteristics or user usage. For example, in the case of a physical application, since it is possible to use this application independent of the status of the network, a value (for example, "100"), which denotes a high suitability related to user convenience may be set as the convenience 1002. In the case of a virtual application, since there are case where this application must be used in the online mode, a value (for example, "50"), which denotes a low suitability related to the user convenience, may be set as the convenience 1002.

In this embodiment, information related to the support OS of the application is used as the evaluation formula input for the convenience 1002. In a case where the execution environment 1001 is "standard", that is, in a case where the application is a physical application, a low number of clients that have an OS corresponding to the support OS signifies that fewer users are able to utilize this application. For this reason, the user convenience is low. Alternatively, in a case where the execution environment 1001 is "virtual", that is, in a case where the application is a virtual application, it is possible to execute the application independent of the client OS. For this reason, the user convenience is high. In this embodiment, in a case where the user convenience is high, a large value (or an evaluation formula via which a large value is calculated) may be set as the convenience 1002. In a case where the user convenience is low, a small value (or an evaluation formula via which a small value is calculated) may be set as the convenience 1002.

The security 1003 is an evaluation formula prepared from the standpoint of the overall security level of the network system 10. The "$number of patches@characteristic table" in the drawing denotes that the value of the number of patches 804 of the characteristics table 211 is set, and the "$number of users@usage table" denotes that the value of the number of users 903 of the usage table 212 is set. Further, the "min (A, B)" denotes the smaller of the values of the A and the B therein. In the case of this embodiment, in a case where both the number of patches and the number of users are equal to or larger than a predetermined value (for example, a case where the number of patches is equal to or larger than 20, and the number of users is equal to or larger than 100), it is determined that security suitability is low and that there is no difference, and the evaluation formula for the security 1003 is calculated using (number of patches=20) and (number of users=100). Furthermore, as the security 1003, the column of another table may be inputted, a combination thereof may be inputted, and a fixed value may be inputted similar to the convenience 1002. In this embodiment, in a case where the security risk is high, a large value may be set as the security 1003, and in a case where the security risk is low, a small value may be set as the security 1003. Further, the security 1003 may be either a formula or a value based on at least one of the number of patches of the application or the number of users of the application.

In this embodiment, the number of patches of the application is used as the evaluation formula input for the security 1003. A larger number of patches of an application signifies that a larger number of security vulnerabilities will be discovered, making it possible to determine that the security risk is high. Further, in a case where the execution environment 1001 is "standard", since an application is installed in each client, a larger number of users makes it possible to determine that the security risk is high (in this case, the security evaluation formula will become low). Alternatively, in a case where the execution environment 1001 is "virtual", since the application is managed solely by the application server 101 and a patch is applied as needed, it is possible to determine that the security risk is low. In this embodiment, in a case where it is possible to determine that the security risk is high, a large value (or, an evaluation formula via which a large value is calculated) may be set as the security 1003. Alternatively, in a case where it is possible to determine that the security risk is low, a small value (or, an evaluation formula via which a small value is calculated) may be set as the security 1003.

The operation cost 1004 is an evaluation formula from the standpoint of the cost (operation cost) required in the operational management of the network system 10. The "$number of users@usage table" in the drawing denotes the number of users 903 of the usage table 212. Further, as the operation cost 1004, the column of another table may be inputted, a combination thereof may be inputted, and a fixed value may be inputted similar to the convenience 1002 and the security 1003.

In this embodiment, the number of processes related to operational management tasks, such as the daily security checks carried out by the administrator, is used as the evaluation formula input. On the assumption that the number of processes involved in an operational management task is 0.01 man-days per application, in a case where the execution environment 1001 is "standard", a number of processes that is proportional to the number of users is required (that is, the operation cost is apt to become high). Alternatively, in a case where the execution environment 1001 is "virtual", the application is managed solely by the application server 101, and as such, only the number of processes for a single application is necessary (that is, the operation cost is apt to be low). In this embodiment, in the case of a high operation cost, a large value (or an evaluation formula via which a large value is calculated) may be set as the operation cost 1004. In the case of a low operation cost, a small value (or an evaluation formula via which a small value is calculated) may be set as the operation cost 1004.

In a case where any of the convenience, the security, and the operation cost is referred to hereinafter, it will be called the "operational management evaluation standpoint" or simply the "evaluation standpoint". Further, a value that has been calculated in accordance with an evaluation formula of a certain evaluation standpoint (or a value that is set as a certain evaluation standpoint) denotes the suitability (evaluation value) of the application execution environment in accordance with this certain evaluation standpoint.

In this embodiment, examples of the convenience, the security, and the operation cost are shown in the drawing as the evaluation standpoints, but evaluation standpoints other than these may be used, and the evaluation standpoints may be more granular.

Further, two cases of "standard" and "virtual" are shown in the drawing as the execution environments, but the present invention is applicable even in a case where there are three or more execution environments.

A numerical value is given as the result of calculating the application suitability from the evaluation formula, but a character string or symbol may also be used to denote the suitability.

FIG. 11 is a diagram showing the normalization formula table 215.

Each row of the normalization formula table 215 comprises an evaluation standpoint 1101 and a normalization formula 1102, and corresponds to a single evaluation standpoint.

The evaluation standpoint 1101 is information denoting the operational management evaluation standpoint. In this embodiment, "convenience", "security" and "operation cost" are set as the evaluation standpoint 1101.

The normalization formula 1102 is for correcting the values calculated from each evaluation formula in the evaluation formula table 214 within a range from 0 to 100. The closer a post-correction value is to 0, the lower the suitability of the application for each evaluation standpoint, and the closer the post-correction value is to 100, the higher the suitability of the application for each evaluation standpoint. For example, a case where the post-correction value is close to 0 for the convenience denotes that user convenience is low, and a case where the post-correction value is close to 100 for the convenience denotes that user convenience is high. Also, a case where the post-correction value is close to 0 for the security denotes that the security level for the entire network system 10 is low, and a case where the post-correction value is close to 100 for the security denotes that the security level for the entire network system 10 is high. Further, a case where the post-correction value is close to 0 for the operation cost denotes that the operation cost is high, and a case where the post-correction value is close to 100 for the operation cost denotes that the operation cost is low.

Furthermore, the "$convenience", the "$security" and the "$operation cost" in the drawing respectively denote values calculated in accordance with the evaluation formulas of the convenience 1002, the security 1003, and the operation cost 1004 in the evaluation formula table 214 will be the input.

In this embodiment, the evaluation policy 213 comprises the evaluation formula table 214 and the normalization formula table 215, but the evaluation formula table 214 and the normalization formula table 215 may be configured as a single table.

Further, the evaluation policy 213 may be set in the management server 100 beforehand, may be inputted by the administrator, or may be provided from outside of the network system 10 the same as the characteristics table 211. The management server 100 may also comprise evaluation formula candidates, and either one or a combination of these may be inputted by the administrator as the evaluation policy 213.

FIG. 12 is a diagram showing the suitability evaluation table 216.

Each row of the suitability evaluation table 216 comprises an application ID 1201, an execution environment 1202, a convenience 1203, a security 1204, and an operation cost 1205, and corresponds to a single application to be used on the network system 10.

The application ID 1201 is information for uniquely specifying the application being used on the network system 10, and specifically, for example, is the same value as the value of the ID 801 of the characteristics table 211.

The execution environment 1202 is information denoting the execution environment of the application. The types of values set as the execution environment 1202 are the same as those of the execution environment 604 of the inventory table 418 of FIG. 6.

The convenience 1203, the security 1204, and the operation cost 1205 are values that the suitability evaluation program 208 respectively calculates based on the evaluation policy 213. For example, the convenience 1203 of the row comprising an application ID of "1" and an execution environment of "standard" is the value calculated in accordance with the evaluation formula (the evaluation formula inside the evaluation formula table 214) of the convenience 1002 of the row comprising the execution environment of "standard" and the normalization formula (the normalization formula inside the normalization formula table 215) of the normalization formula 1102 of the row comprising the evaluation standpoint of "convenience". The same holds true for the security 1204 and the operation cost 1205.

According to this table 216, evaluation values for all the application execution environments are stored for each application. The evaluation value is the value of the evaluation for each evaluation standpoint.

FIG. 13 is a diagram showing the effect evaluation table 217.

Each row of the effect evaluation table 217 comprises an application ID 1301, a pre-change 1302, a post-change 1303, a convenience 1304, a security 1305, and an operation cost 1306, and corresponds to a candidate for an application execution environment change.

The application ID 1301 is information for uniquely specifying the application being used on the network system 10, and specifically, for example, is the same value as the value of the ID 801 of the characteristics table 211.

The pre-change 1302 is information (for example, a character string) denoting the current execution environment of the application. The value set as the pre-change 1302 is the same as that of the execution environment 604 of the inventory table 418 of FIG. 6.

The post-change 1303 is information denoting the post-change execution environment of the application. Similar to the pre-change 1302, either "standard" or "virtual" is set as the post-change 1303. However, the pre-change 1302 and the post-change 1303 in the same row never have the same value. This is because there is not change in the application execution environment in a case where the pre-change 1302 and the post-change 1303 are the same value.

The convenience 1304, the security 1305, and the operation cost 1306 are values respectively denoting the effect on the respective evaluation standpoints in a case where the application execution environment might be changed from the execution environment denoted by the pre-change 1302 to the execution environment denoted by the post-change 1303. In this embodiment, in two rows in which the application ID 1201 are identical and the execution environments 1202 are different (two rows inside the suitability evaluation table 216 explained using FIG. 12), the difference between the conveniences 1203, the difference between the securities 1204 and the difference between the operation costs 1205 are respectively calculated as the effects of changing the execution environment. A numeric value from −100 to +100 is set as the difference. The closer the difference is to −100, the lower the effect resulting from the change is, and the closer the difference is to +100, the higher the effect resulting from the change is. For instance, according to the example of FIG. 13, in the case where the application execution environment has been changed from "standard" to "virtual" for the application with the application ID 1301 of "1" (that is, in the case where the application has been changed from a physical application to a virtual application), it is clear that there is not much effect on the user convenience, there is a slight effect from the standpoint of security, and there is a considerable effect on reducing the operation cost.

FIG. 14 is a diagram showing the evaluation standpoint priority table 219.

Each row in the evaluation standpoint priority table 219 comprises an evaluation standpoint 1401 and a priority 1402, and corresponds to a single evaluation standpoint.

The evaluation standpoint 1401 is information denoting the operational management evaluation standpoint. In the case of this embodiment, any of "convenience", "security", and "operation cost" are set as the evaluation standpoint 1401.

The priority 1402 is information (typically a numeric value) denoting the priority of the evaluation standpoint. The priority 1402 is used as a coefficient for assigning a weight to each evaluation standpoint when calculating the priority ranking of an application targeted for execution environment change. A priority 1402 of high value is set for an evaluation standpoint with a high priority, and a priority 1402 of low value is set for an evaluation standpoint with a low priority. In a case where the standpoint seen as important from the aspect of operational management differs in accordance with the administrator and the network system 10, setting the priority 1402 makes it possible to calculate an application priority ranking (the priority ranking of the application targeted for an execution environment change) that is tailored to the operation policy of the network system 10. For example, in the case of a network system 10 that places particular emphasis on security, the value of the priority 1402 corresponding to the evaluation standpoint "security" may be higher than the value of the priority 1402 corresponding to the other evaluation standpoints 1401.

In this embodiment, the administrator sets the priority 1402 via the operation management policy setting screen 2200 that will be explained using FIG. 23. In a case where the priority is set to "high", "3" is set as the priority 1402. Similarly, in the case of "medium", it is set to "2", and in the case of "low", it is set to "1".

FIG. 15 is a diagram showing the change priority ranking table 220.

Each row of the change priority ranking table 220 comprises a priority ranking 1501, an application ID 1502, a pre-change 1503, and a post-change 1504, and corresponds to an application that is a candidate for an execution environment change.

The priority ranking 1501 is set with a numeric value that denotes the priority ranking of an application for which the execution environment will change. The highest priority ranking is 1, and the lower the priority ranking the higher the set numeric value becomes.

The application ID 1502 is information for uniquely specifying the application that is being used on the network system 10, and specifically, for example, is set with the same value as the value of the ID 801 of the characteristics table 211.

The pre-change 1503 is information denoting the current execution environment of the application. The type of value that is set is the same as the type of the execution environment 604 of the inventory table 418 of FIG. 6.

The post-change 1504 is information denoting the post-change execution environment of the application. Similar to the pre-change 1503, either "standard" or "virtual" is set. The pre-change 1503 and the post-change 1504 in the same row never have the same value.

FIG. 16 is a diagram showing the client list table 221.

Each row of the client list table 221 comprises a host name 1601, an IP address 1602, and an OS 1603, and corresponds to a single client 102.

The host name 1601 is information denoting the name of the client 102.

The IP address 1602 is information for uniquely identifying a client 102 in the network system 10. The value of the IP address 1602 is used when communicating with the client 102. In this embodiment, the IP address of the client 102 is set as the IP address 1602.

The OS 1603 is information denoting the OS of the client 102.

[Processing of Programs Inside Management Server 100]

Figure 17:
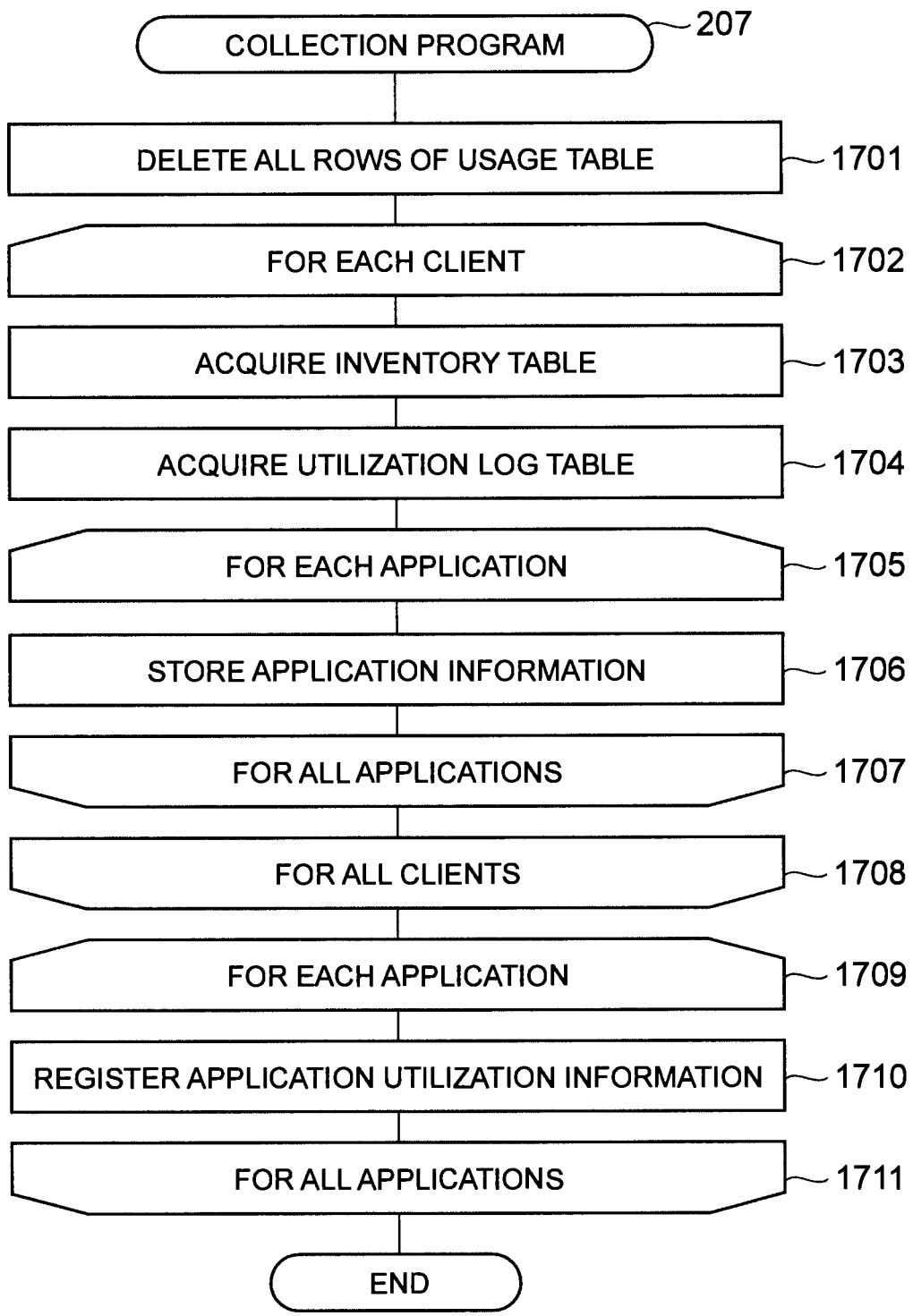
FIG. 17 is a diagram showing the processing steps of a collection program 207 related to the first embodiment.

FIG. 17 is a diagram showing the processing steps of the collection program 207.

The collection program 207 acquires from all the clients a list of the applications and the application utilization log used on each client 102, and updates the usage table 212.

Specifically, first the program 207 deletes all the rows of the usage table 212 (Step 1701).

Next, the program 207 repeats the following Step 1703 through Step 1707 for each row of the client list table 221 (Step 1702).

(Step 1703) The program 207 acquires the inventory table 418 (specifically, all the information that is stored in this table 418) of a target client 102 from the agent program 407 of this target client 102 (Step 1703). The "target client 102" here is the client 102 that has the IP address of the IP address 1602 in the row (a row inside the table 221) currently targeted for processing.

(Step 1704) The program 207 acquires from the agent program 407 of the target client 102 the utilization log table 419 (specifically, all the information stored in this table 419) of the target client 102.

The program 207 stores the inventory table 418 acquired in Step 1703 and the utilization log table 419 acquired in Step 1704 in the primary storage device 201.

(Step 1705) The program 207 repeats Step 1706 for each row of the inventory table 418 acquired in Step 1703.

(Step 1706) For example, it is supposed that in the row (a row inside the table 418) currently targeted for processing, the value of the application name 602 is "application name 17a", the value of the version 603 is "version 17a" and the value of the execution environment 604 is "execution environment 17a". The program 207 stores the application information in the primary storage device 201. Specifically, the program 207 stores the application name "application name 17a", the version "version 17a", the execution environment "execution environment 17a", and a number of users "1". Furthermore, in a case where a combination that matches the combination of the application name, the version, and execution environment has already been stored in the primary storage device 201, in this Step 1706, the program 207 adds 1 to the value of the number of users stored in the primary storage device 201 corresponding to this combination.

(Step 1707) The program 207 proceeds to the next step in a case where processing has been performed for all the rows of the inventory table 418 acquired in Step 1703 (Step 1707).

The program 207 proceeds to the next step once Step 1702 through Step 1704 have been repeated for all the rows of the client list table 211 (Step 1708).

Next, the program 207 repeats Step 1710 for the information of each application stored in the primary storage device 201 in Step 1706 (Step 1709).

(Step 1710) For example, it is supposed that the application name is "application name 17b", the version is "version 17b", the execution environment is "execution environment 17b", and the number of users is "number of users 17b" in the application information currently targeted for processing. The program 207 acquires from the characteristics table 211 the value "ID17" of the ID 801 inside the row in which the value of the application name 802 matches the "application name 17b" and the value of the version 803 matches the "version 17b", and thereafter, registers a new row in the usage table 212. In this new row, "ID17" is set as the application ID 901, "execution environment 17b" is set as the execution environment 902, and "number of users 17b" is set as the number of users 903.

In a case where processing has been performed in Step 1706 for all the application information stored in the primary storage device 201, the processing of the program 207 ends (Step 1711).

Figure 18:
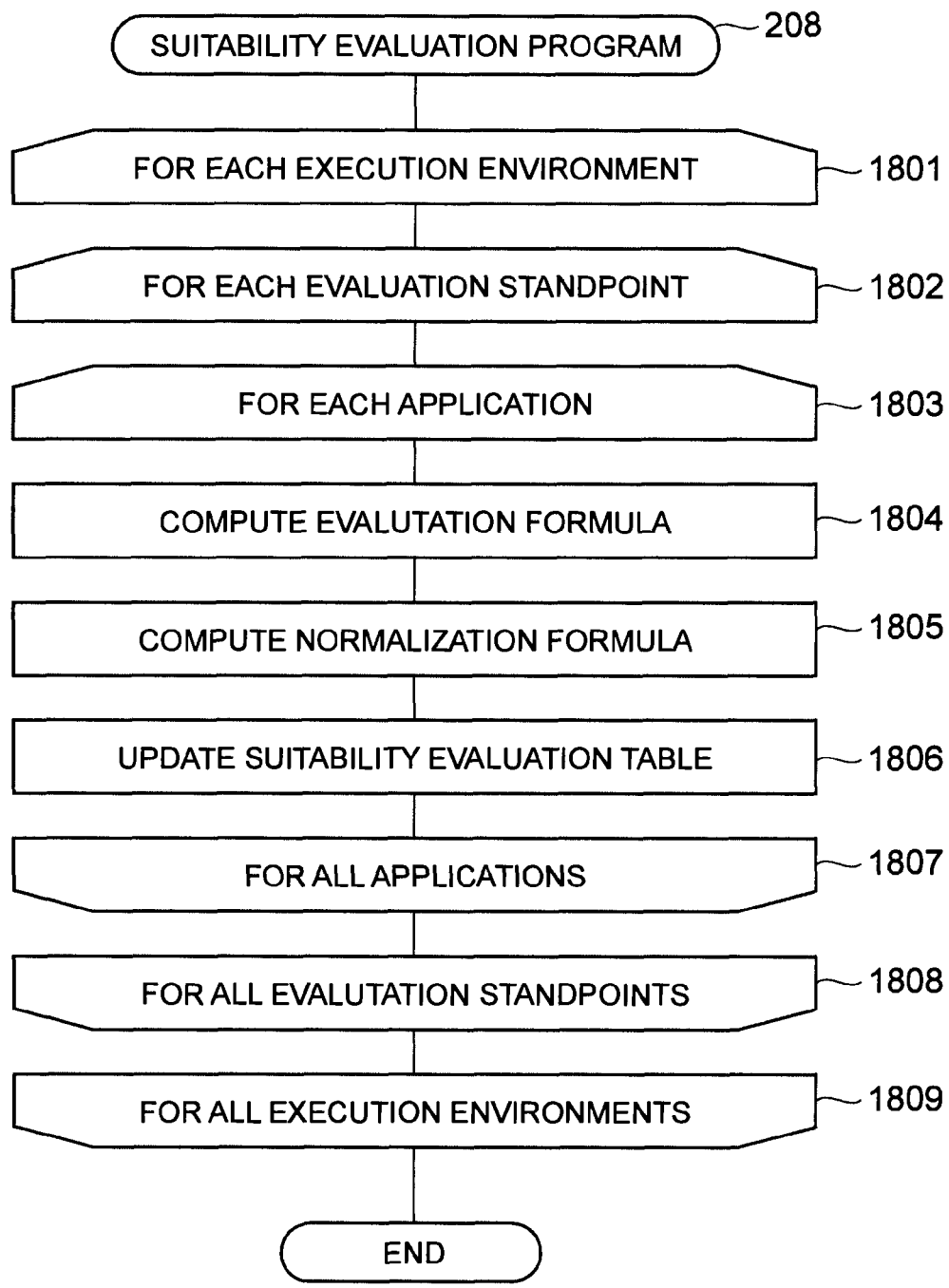
FIG. 18 is a diagram showing the processing steps of a suitability evaluation program 208 related to the first embodiment.

FIG. 18 is a diagram showing the processing steps of the suitability evaluation program 208.

The suitability evaluation program 208 calculates the suitability of the application for each execution environment based on the characteristics table 211, the usage table 212 and the evaluation policy 213, and updates the suitability evaluation table 216.

Specifically, first, the suitability evaluation program 208 repeats Step 1802 through Step 1808 for each row of the evaluation formula table 214 (Step 1801).

(Step 1802) For example, is it supposed that the value of the execution environment 1001 in the row (a row inside the table 214) currently targeted for processing is "execution environment 18". The program 208 repeats Step 1803 through Step 1807 for each column (the convenience 1002, the security 1003, and the operation cost 1004) that denotes an evaluation standpoint in the row currently targeted for processing (Step 1802).

(Step 1803) For example, it is supposed that the name of the column currently targeted for processing is "execution standpoint 18", and that the value of the column is "evaluation formula 18". The program 208 repeats Step 1804 through Step 1806 for each row of the usage table 212 (Step 1803).

(Step 1804) For example, it is supposed that the application ID 901 in the row currently targeted for processing is "application ID 18". The program 208 calculates the "evaluation formula 18" and calculates the evaluation value in accordance therewith (Step 1804). There may be cases in which a character string denoted by "$<column name>@<table name>" (for example, "$support OS@characteristics table") exists in the "evaluation formula 18" at this time. In the case of this embodiment, the <table name> is either "characteristics table" or "usage table". In a case where the <table name> is "characteristics table", the row in which the application ID 801 matches the "application ID 18" in the characteristics table 211 is selected, and the value of the column in which the column name matches <column name> is replaced with "$<column name>@<table name>". The same holds true in a case where the <table name> is "usage table", and the row in which the application ID 901 matches the "application ID 18" in the usage table 212 is selected, and the value of the column in which the column name matches <column name> is replaced with "$<column name>@<table name>". Further, the character strings denoted by "NUM(@<table name>)" is replaced with the number of rows in the table of the <table name>. In the case of the character string denoted by "NUM ($<column name 1>=$<column name 2>@<table name 2> in@<table name 1>)", the "$<column name 2>@<table name 2>", as explained hereinabove, refers to the <column name 2> column in either the characteristics table 211 or the usage table 212, and the value of the <column name 1> column in the <table name 1> table is replaced by the number of rows that comprise the value of the <column name 2> column.

(Step 1805) The program 208 calculates the normalization formula 1102 inside the row in which the value of the evaluation standpoint 1101 matches the "evaluation standpoint 18" in the normalization formula table 215, and calculates a value in accordance therewith (Step 1805). Since a character string denoted by "$<evaluation standpoint>" (for example, "$convenience") exists in the normalization formula at this time, this evaluation standpoint is replaced with the evaluation value calculated in Step 1804.

(Step 1806) The program 208 selects from the suitability evaluation table 216 the row in which the application ID 1201 matches the "application ID 18" and the execution environment 1202 matches the "execution environment 18", and sets the value calculated in Step 1805 as the value of the column in which the column name matches the "evaluation standpoint 18". In a case where the relevant row does not exist, the program 208 registers a new row. In the new row, the "application ID 18" is set as the application ID 1201, and the "execution environment 18" is set as the execution environment 1202.

The program 208 proceeds to the next step in a case where processing has been performed for all the rows of the usage table 212 (Step 1807).

The program 208 proceeds to the next step in a case where processing has been performed for all the columns (the convenience 1002, the security 1003, and the operation cost 1004) denoting an evaluation standpoint in the row currently targeted for processing in the evaluation formula table 214 (Step 1808).

In a case where processing has been performed for all the rows of the evaluation formula table 214, the processing of the suitability evaluation program 208 ends (Step 1809).

Figure 19:
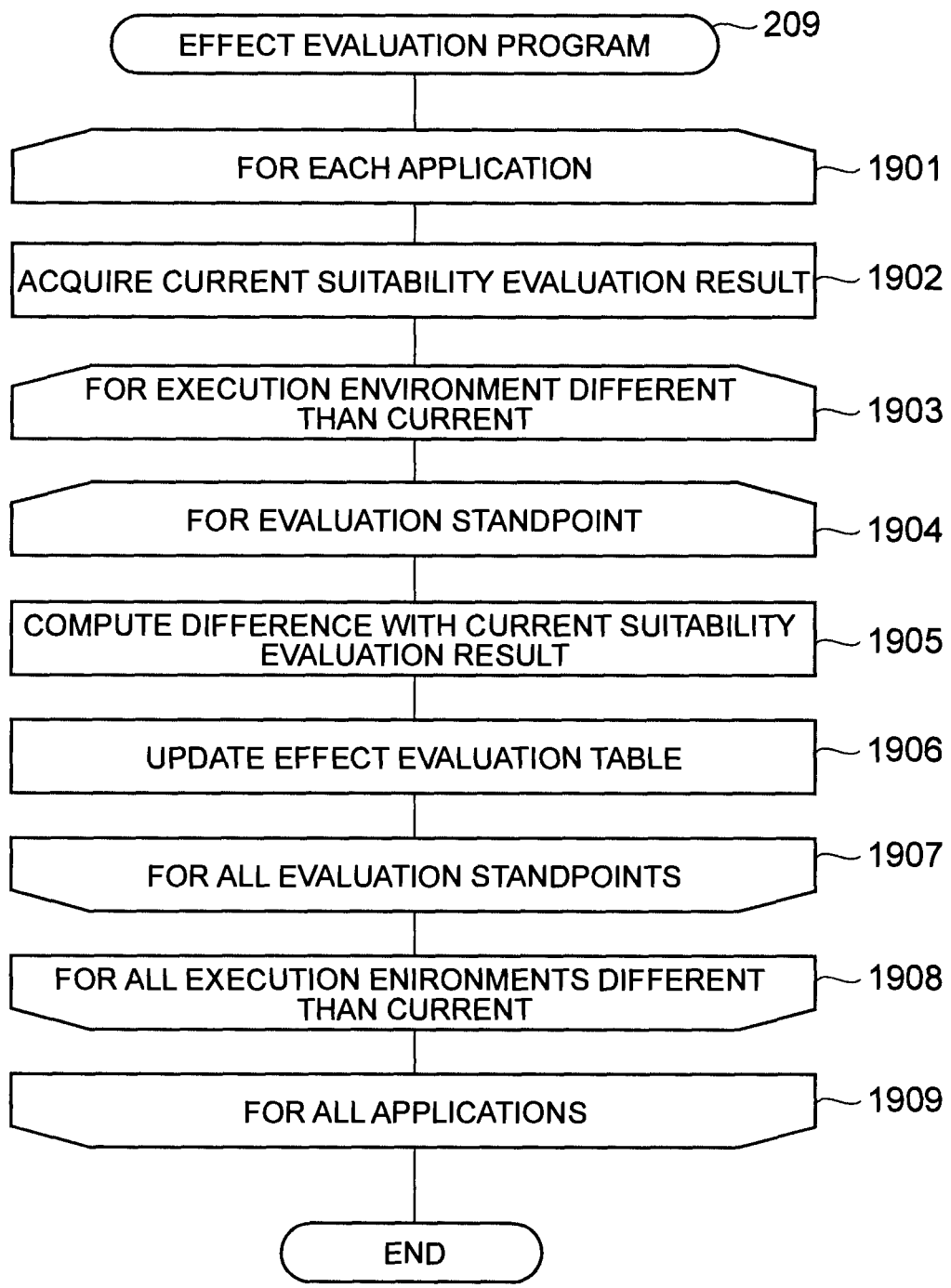
FIG. 19 is a diagram showing the processing steps of an effect evaluation program 209 related to the first embodiment.

FIG. 19 is a diagram showing the processing steps of the effect evaluation program 209.

The effect evaluation program 209, based on the suitability evaluation table 216, calculates the effect in a case where the application execution environment might be changed, and updates the effect evaluation table 217.

Specifically, first, the program 209 repeats Step 1902 through Step 1908 for each row of the usage table 212 (Step 1901).

(Step 1902) For example, in the row (a row inside the table 212) that is currently targeted for processing, it is supposed that the application ID 901 is the "application ID 19" and the execution environment 902 is the "execution environment 19a". The program 209 selects from the suitability evaluation table 216 the row in which the application ID 1201 matches the "application ID 19" and the execution environment 1202 matches the "execution environment 19a", and acquires from this row the values of the respective columns (the convenience 1203, the security 1204, and the operation cost 1205) that denote evaluation standpoints. It is supposed that the value of the acquired convenience 1203 is "convenience 19a", the value of the acquired security 1204 is "security 19a" and the value of the acquired operation cost 1205 is "operation cost 19a".

(Step 1903) The program 209 repeats Step 1904 through Step 1907 for each row in which the application ID 1201 matches the "application ID 19" and the execution environment 1202 does not match the "execution environment 19a" in the suitability evaluation table 216.

(Step 1904) For example, in the row (a row inside the table 216) that is currently targeted for processing, it is supposed that the execution environment 902 is the "execution environment 19b", the convenience 1203 is the "convenience 19b", the security 1204 is the "security 19b", and the operation cost 1205 is the "operation cost 19b". The program 209 repeats Step 1905 of the respective columns (the convenience 1203, the security 1204, and the operation cost 1205) denoting evaluation standpoints in the row that is currently targeted for processing.

(Step 1905) The program 209 subtracts the value acquired in Step 1902 from the value of the column currently targeted for processing, and calculates the difference of the values in the "execution environment 19a" and the "execution environment 19b". Specifically, for example, the program 209 calculates the difference between the "convenience 19a" and the "convenience 19b", the difference between the "security 19a" and the "security 19b", and the difference between the "operation cost 19a" and the "operation cost 19b".

(Step 1906) The program 209 selects the row in the effect evaluation table 217 in which the application ID 1301 that matches the "application ID 19", the pre-change 1302 that matches the "execution environment 19a", and the post-change 1303 that matches the "execution environment 19b". The program 209 sets the value calculated in Step 1905 in the column in which the column name matches the name of the column currently targeted for processing in the selected row. In a case where the relevant row does not exist, the program 209 registers a new row. In the new row, the "application ID 19" is set as the application ID 1301, the "execution environment 19a" is set as the pre-change 1302, and the "execution environment 19b" is set as the post-change 1303.

The program 209 proceeds to the next step in a case where the processing has been performed for all the columns denoting evaluation standpoints in the row currently targeted for processing in the suitability evaluation table 216 (Step 1907).

The program 209 proceeds to the next step in a case where the processing has been performed for all the rows in the suitability evaluation table 216 in which the application ID 1201 matches the "application ID 19" and the execution environment 1202 does not match the "execution environment 19a" (Step 1908).

In a case where the processing has been performed for all the rows of the usage table 212, the processing of the program 209 ends (Step 1909).

Figure 20:
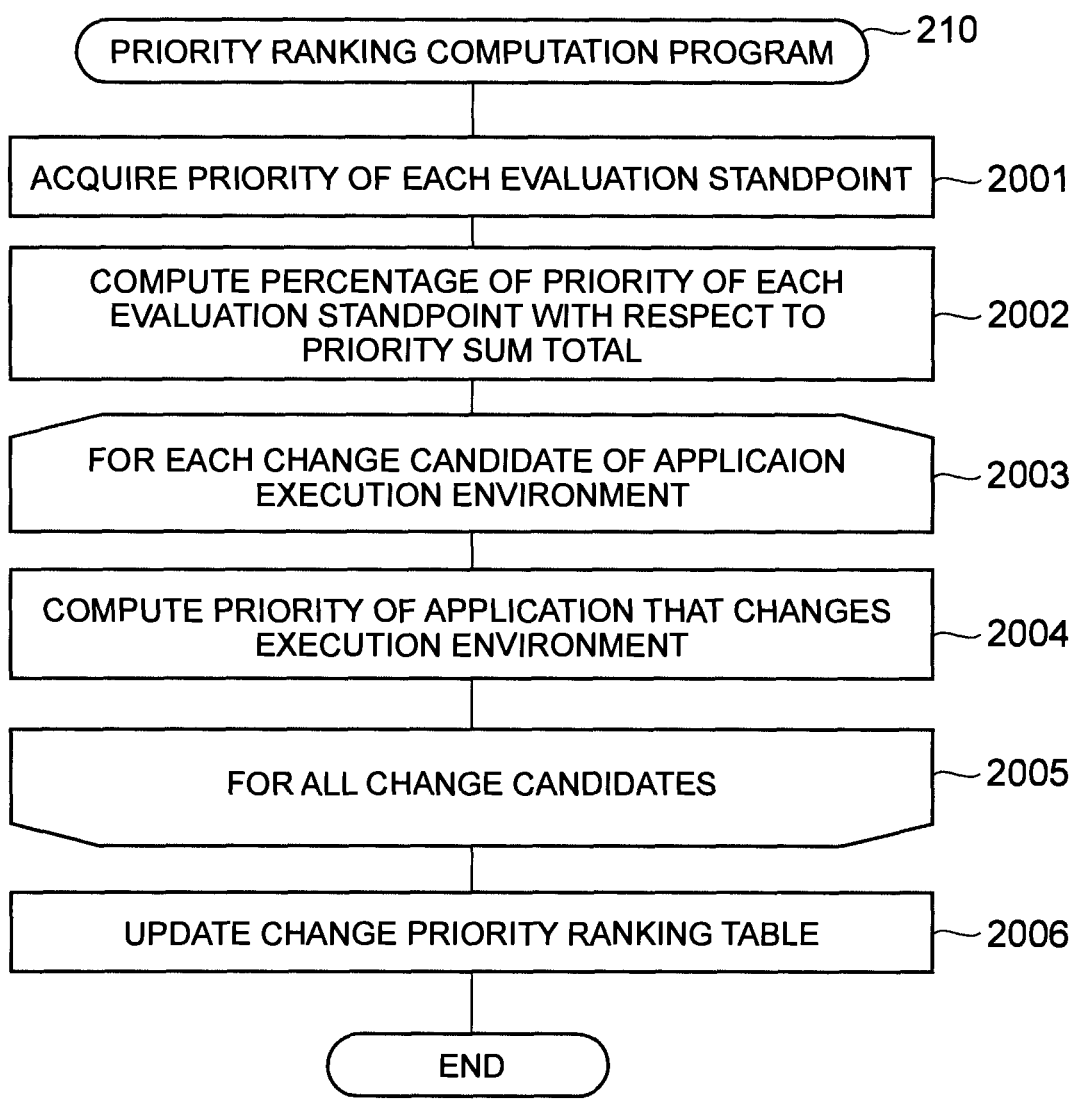
FIG. 20 is a diagram showing the processing steps of a priority ranking calculation program 210 related to the first embodiment.

FIG. 20 is a diagram showing the processing steps of the priority ranking calculation program 210.

The priority ranking calculation program 210, based on the effect evaluation table 217 and the operation management policy 218, calculates the priority ranking of the application for which the execution environment is to be changed, and updates the change priority ranking table.

Specifically, first, the program 210 acquires the priorities of the evaluation standpoints from the evaluation standpoint priority table 219 (Step 2001).

Next, the program 210 calculates the percentage of the priority of each evaluation standpoint with respect to the sum total of the evaluation standpoint priorities acquired in Step 2001 (Step 2002). In this embodiment, as was explained using FIG. 14, "3" is set as the "operation cost", "2" is set as the "security", and "1" is set as the "convenience". Therefore, with respect to the sum total of the priorities, the priority percentage of the "operation cost" is "0.5", the priority percentage of the "security" is "0.33", and the priority percentage of the "convenience" is "0.17".

The program 210 repeats Step 2004 for each row of the effect evaluation table 217 (Step 2003).

(Step 2004) The program 210 multiplies the value of the column by the priority percentage calculated in Step 2002 for each column (the convenience 1304, the security 1305, and the operation cost 1306) denoting an evaluation standpoint in the row (a row inside the table 217) currently targeted for processing, and calculates the sum total of the multiplication results for each column. For example, in the case of the row in which the application ID 1301 matches "1" in FIG. 13, because the value of the convenience 1304 is "13", the value of the security 1305 is "24", and the value of the operation cost 1306 is "66", the calculated value becomes 13×0.17+24× 0.33+66×0.5≅43. The program 210 stores the information of the row currently targeted for processing and the value calculated in Step 2004 in the primary storage device 201.

The program 210 proceeds to the next step in a case where the processing has been executed for all the rows of the effect evaluation table 217 (Step 2005).

Next, the program 210 stores the information of the respective rows stored in the primary storage device 201 in Step 2004 in the change priority ranking table 220 (Step 2006). In so doing, the program 210 carries out the processing of the rows in order from the largest value (calculated value) stored in the primary storage device 201 in Step 2004. The program 210, in a case where the value of the application ID 1301 is "application ID 20", the value of the pre-change 1302 is "pre-change 20", and the value of the post-change 1303 is "post-change 20" in the row currently targeted for processing, sets the "application ID 20" as the application ID 1502, sets the "pre-change 20" as the pre-change 1503, and sets the "post-change 20" as the post-change 1504 in the target row.

Furthermore, "1" is set as the priority ranking 1501 in the first row, and a value to which 1 has been added is set in order in the rows thereafter.

Furthermore, the priority ranking calculation method is not limited to the example given above. For example, applications may be stored in the change priority ranking table 220 in order from the application for which the evaluation value set in the effect evaluation table 217 is large in relation to the evaluation standpoint with the large priority 1402 value in the evaluation standpoint priority table 219. Further, instead of consecutive numbers called a priority ranking, a priority may be calculated and stored in the table 220. In accordance with this, the value calculated in Step 2004 may be used as the application priority.

Figure 21:
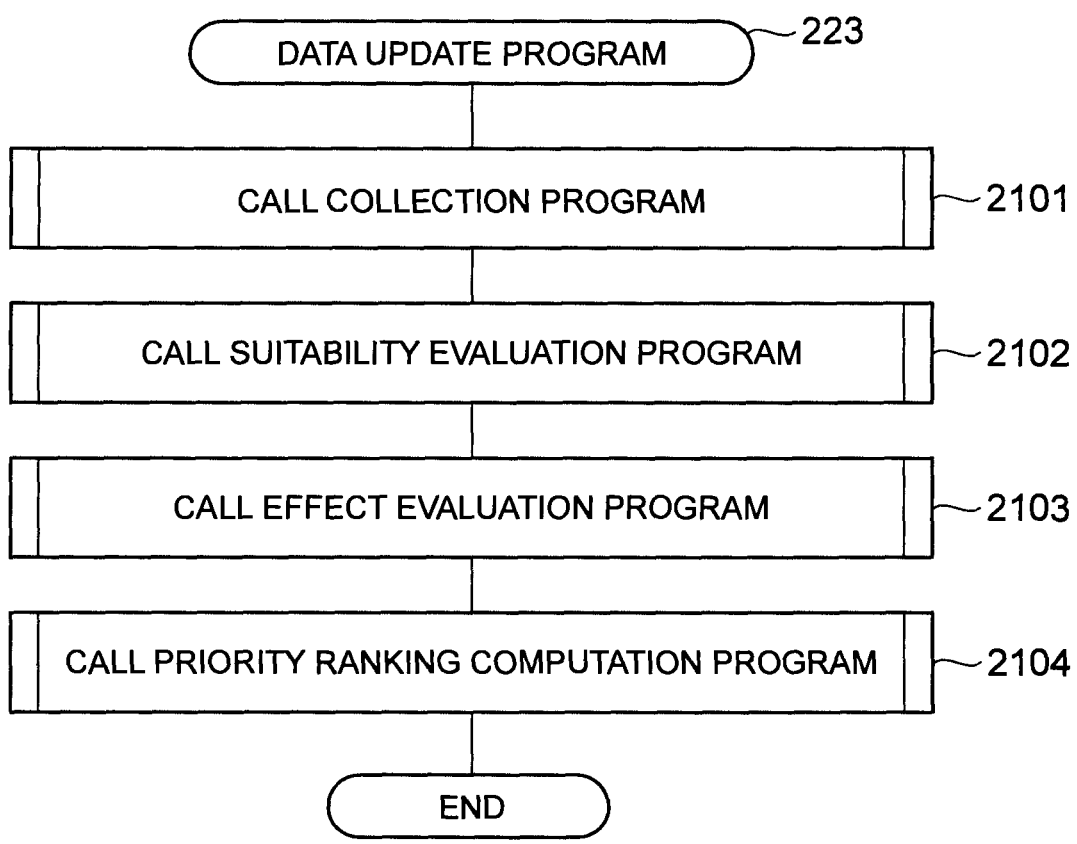
FIG. 21 is a diagram showing the processing steps of a data update program 223 related to the first embodiment.

FIG. 21 is a diagram showing the processing steps of the data update program 223.

The data update program 223 is triggered by pressing the update button 2205 in a priority ranking list screen 2200, which will be explained using FIG. 22, and updates application and other such information maintained by the management server 100.

Specifically, first the program 223 calls the collection program 207 (Step 2101).

Next, the program 223 calls the suitability evaluation program 208 (Step 2102).

Next, the program 223 calls the effect evaluation program 209 (Step 2103).

Next, the program 223 calls the priority ranking calculation program 210 (Step 2104).

The processing of the data update program 223 ends when the processing of the priority ranking calculation program 210 ends.

In this embodiment, a method in which pressing the update button 2205 triggers the execution of the data update program 223 is used, but another trigger may be used, such as a method in which the management server 100 executes the data update program 223 on a regular basis.

Figure 22:
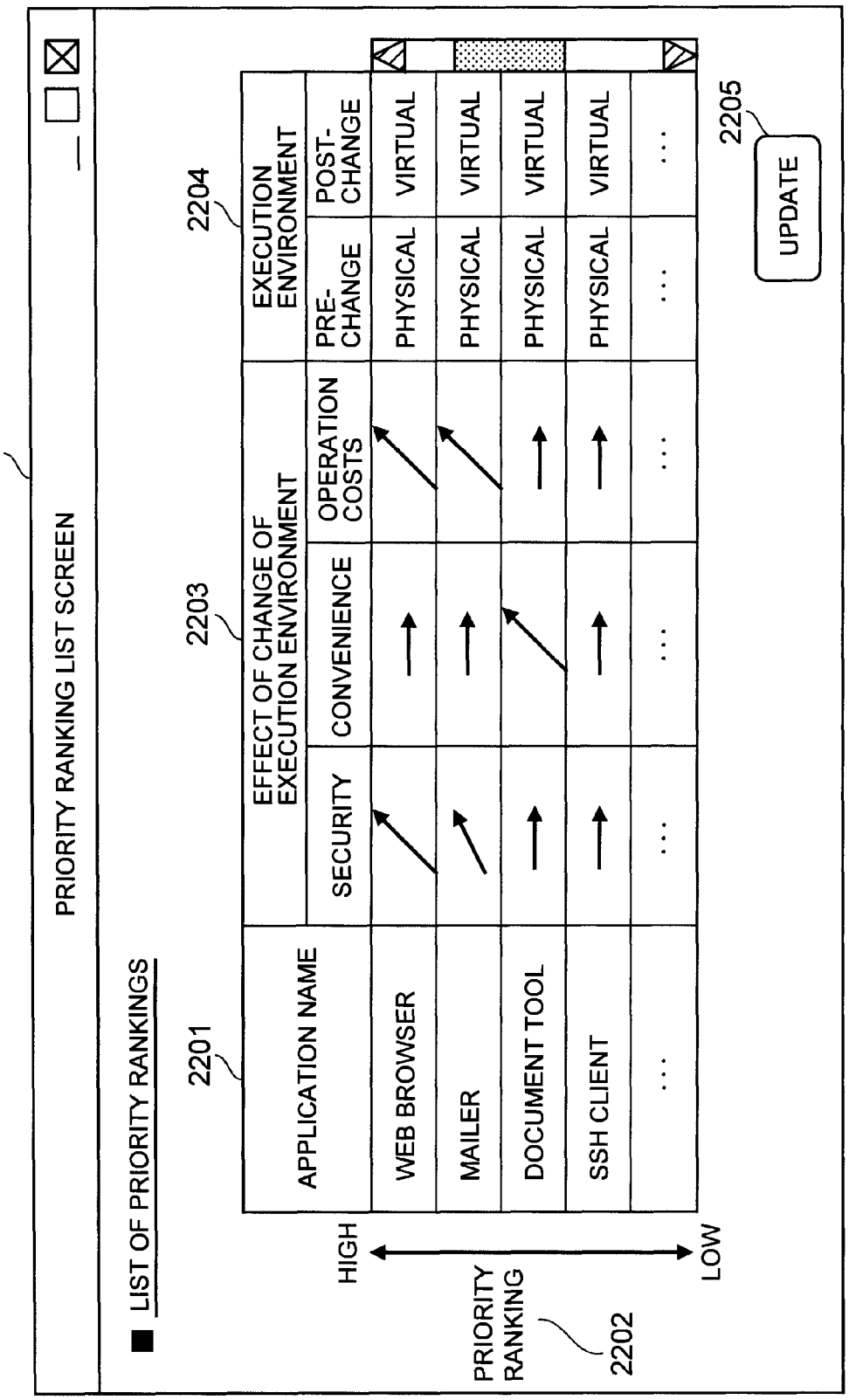
FIG. 22 is a diagram showing a priority ranking list screen 2200 related to the first embodiment.

FIG. 22 is a diagram showing the priority ranking list screen 2200.

The priority ranking list screen 2200 is for displaying an application for which the execution environment is able to be changed in accordance with the priority ranking calculated by the priority ranking calculation program 210. This screen 2200 is displayed on the display device 206 by the screen control program 222. An application name 2201, an effect of change of execution environment 2203, and an execution environment 2204 are displayed for each application inside the network system 10. Rows comprising items 2201, 2203 and 2204 are displayed in descending order from the application with the highest priority ranking. Furthermore, in a case where the application priority ranking is known, the display may be performed using another scheme.

The application name 2201 is a value that is acquired from the application name 802 of the characteristics table 211.

The priority ranking 2202 shows that the an application located towards the top of the screen has a higher priority ranking for a change of execution environment, and an application located toward the bottom of the screen has a lower change priority ranking. That is, the order in which the applications are displayed is determined based on the priority ranking 1501 of the change priority ranking table 220.

The effect of change of execution environment 2203 denotes the effect resulting from changing the execution environment for each operational management evaluation standpoint. This effect is displayed using an arrow that makes it possible to grasp the effect visually and intuitively. The more an arrow points upward (the closer the angle of the arrow is to 90 degrees), the higher the effect of the change will be, and the closer the arrow is to being horizontal (the closer the angle of the arrow is to 0 degrees), the less the effect of the change will be. The orientation (angle) of the arrow for each evaluation standpoint is determined based on the evaluation value for each evaluation standpoint inside the effect evaluation table 217. Furthermore, either instead of or in addition to the arrows, a numerical value (for example, an evaluation value for each evaluation standpoint inside the effect evaluation table 217) may be displayed.

The execution environment 2204 denotes a pre-change execution environment (that is, the current application execution environment) and a post-change execution environment.

The update button 2205 is for updating the display contents of the screen. In a case where the administrator wants to once again collect information from a client and update the priority ranking information, he presses the update button 2205. When the update button 2205 is pressed, for example, the screen control program 222 calls the data update program 223 of the management server 100.

Figure 23:
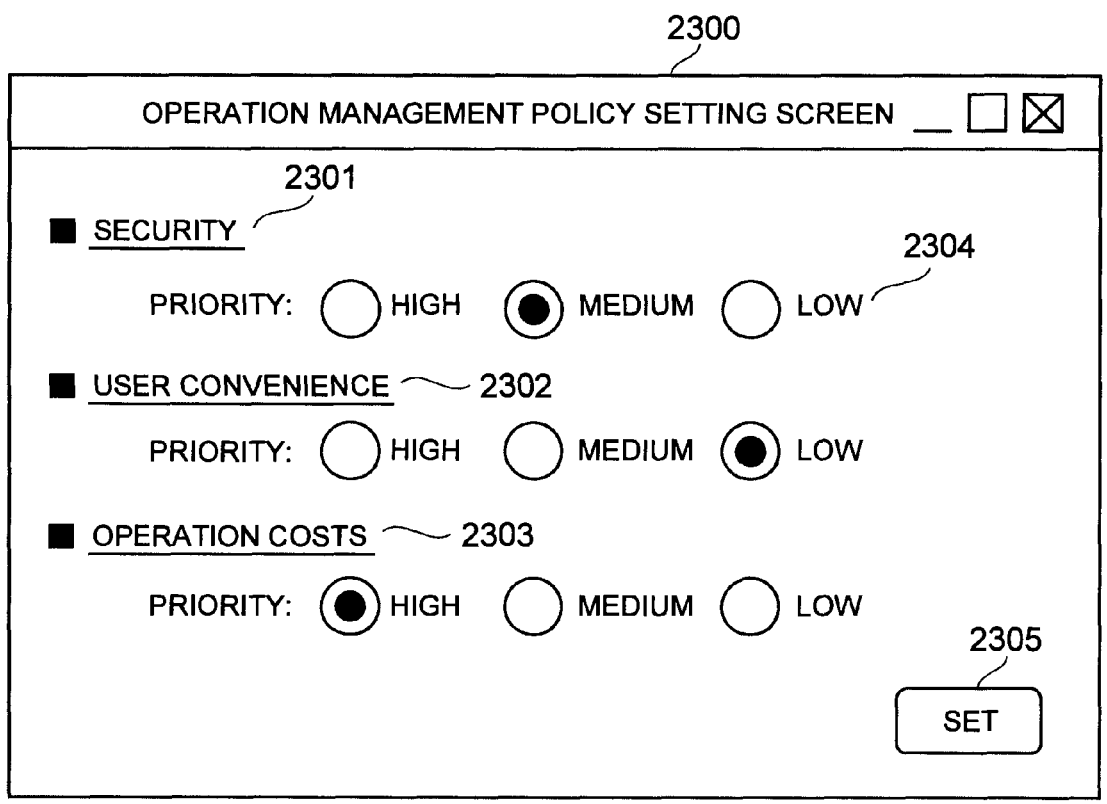
FIG. 23 is a diagram showing an operation management policy setting screen 2300 related to the first embodiment.

FIG. 23 is a diagram showing the operation management policy setting screen 2300.

The operation management policy setting screen 2300 is for setting the priority of each evaluation standpoint. The operation management policy setting screen 2300 is displayed on the display device 206 by the screen control program 222.

A security 2301, a user convenience 2302, and an operation cost 2303 are provided as the operational management evaluation standpoints. An administrator-desired priority is selected from among a plurality of levels of priorities of a priority 2304 for each evaluation standpoint.

A set button 2305 is for reflecting the priority selected for each evaluation standpoint in the evaluation standpoint priority table 219. In this embodiment, in a case where a "high" priority is selected, a "3" is set as the priority 1402 in the table 219, in a case where a "medium" priority is selected, a "2" is set, and in a case where a "low" priority is selected, a "1" is set.

FIG. 24 is a diagram showing the application information registration screen 2400.

The application information registration screen 2400 is for registering information denoting the characteristics of an application in the management server 100.

In this embodiment, an application name, a version, a number of patches, and a support OS are respectively inputted into an application name input column 2401, aversion input column 2402, a number of patches input column 2403 and a support OS input column 2404, and the inputted information is stored in the characteristics table 211 in accordance with a registration button 2405 being pressed.

A list of registered applications 2406 shows a list of information related to an application that has already been registered. The information included in the list 2406 is the same as the information stored in the characteristics table 211. The list 2406 need not comprises all of the information stored in the characteristics table 211 (for example, it need not comprise information related to a portion of the items).

<Example of Evaluation Standpoint Change>

A variety of changes other than those described in this embodiment are possible with regard to the information that constitutes the evaluation formula input in the evaluation policy 213. An example of evaluation formula input information is described below for each operational management evaluation standpoint.

(A) Convenience (a1) Application Version

It is conceivable that user convenience will be lost in a case where there are numerous types of application versions and the different versions lack compatibility, thereby making it impossible to handle data being exchanged between users and changing the behavior of the application. For an application like this, a virtual application that makes it possible to execute a plurality of versions of different users on the same client 102 is suitable. As was explained using FIG. 8, the application version is stored in the characteristics table 211. The suitability evaluation program 208, based on the evaluation policy 213, determines that the suitability in a virtual environment is high and the suitability in a physical environment is low for an application (for example, an application with more than a predetermined number of version types) that has the same application name but numerous version types. In addition, the suitability evaluation program 208 is also able to determine that the suitability in the virtual environment is even higher for an application for which all versions are used often with no bias in the number of users for each version. As was explained using FIG. 9, the number of users pre version is stored in the usage table 212.

(a2) Use of a Shared Library

In a case where an application makes use of a shared library, it is conceivable that there will be cases in which the application will compete with another application for use of the shared library, and that user convenience will be lost due to the application becoming impossible to execute. For an application like this, a virtual application that enables the application to be executed without being aware of the shared library competition is suitable. The presence or absence of a shared library may be stored in the characteristics table 211. Further, the specific name of the shared library may be stored in the table 211. In the evaluation policy 213, in a case where an application is using a shared library, the suitability evaluation program 208 determines that the suitability of the virtual application is high and the suitability of the physical application is low.

(a3) Implementation Time

In the case of a physical application, it is possible for the user to install this application in the client 102 himself, but for a virtual application, time is needed for the administrator to create the virtual application and to commence to provide this virtual application to the client 102. A value denoting the implementation time may be set in the evaluation policy 213 as a fixed value that is a function of the execution environment. The suitability evaluation program 208, based on the evaluation policy 213, determines the suitability in the virtual environment as being low for an application with a short implementation time, and determines the suitability in the virtual environment as being high for an application with a long implementation time.

(B) Security (b1) Patch Application Frequency

In a case where it is necessary to apply a patch to an application, the security risk becomes higher when the application of the patch is delayed. In the case of a physical application, a patch must be applied to each client 102 in which the application is installed, so that the patch application frequency is lower than that of a virtual application, which is managed solely by the application server 101. A value denoting the patch application frequency may be set in the evaluation policy 213 as a fixed value that is a function of the execution environment. For example, this frequency is once a month in the case of the physical application, and is once a week in the case of the virtual application. The suitability evaluation program 208, based on the evaluation policy 213, determines that the suitability in the virtual environment is high for an application with a high patch application frequency. In addition, since there is a tendency for the patch application frequency to become lower for a larger number of users in the case of the physical application, the suitability evaluation program 208 is also able to determine that the suitability in the physical environment is low for an application with a large number of users. As was explained using FIG. 9, the number of users for an application is stored in the usage table 212.

(C) Operation Cost (c1) Number of Processes for Implementation

The more numerous the tasks required for implementing an application, the higher the cost of the application becomes. In the case of a physical application, the user is able to install the application in the client 102 himself, but in the case of a virtual application, the task of the administrator creating the virtual application is costly. Further, in the case of the virtual application, the number of implementation processes may change in accordance with the application since the steps for implementing the virtual application will differ by application. A value denoting the number of implementation processes may be set in the evaluation policy 213 as a fixed value that is a function of the implementation mode. Further, the different number of implementation processes for each application may be stored in the characteristics table 211. The suitability evaluation program 208, based on the evaluation policy 213, is able to determine that the suitability of the virtual environment is high for an application with a small number of implementation processes (for example, an application with a number of implementation processes that is lower than a predetermined value).

Furthermore, an example of the storage destination of the value prepared in accordance with the above-described change example is given in the above explanation, but this value storage destination is not limited to the above explanation. For example, the value denoting the implementation time may be set in different information instead of being set in the evaluation policy 213.

(Effects of this Embodiment)

According to this embodiment, in a network system 10 in which a physical environment and a streaming-type virtual environment coexist, the suitability of an application in each execution environment is evaluated based on operational management evaluation standpoints, and the priority ranking of an application for which the execution environment is to change and the effect of the change of the execution environment are displayed. In accordance with this, the administrator is able to select an execution environment that is appropriate for the application.

[Embodiment 2]

Next, a second embodiment of the present invention will be explained. In so doing, only the points of difference with the first embodiment will be explained, and explanations of the points in common with the first embodiment will either be omitted or abbreviated (this also holds true for the third through the sixth embodiments below).

The second embodiment is related to a network system in which a host-type virtual environment exists. The client remotely executes an application in the application server.

Figure 25:
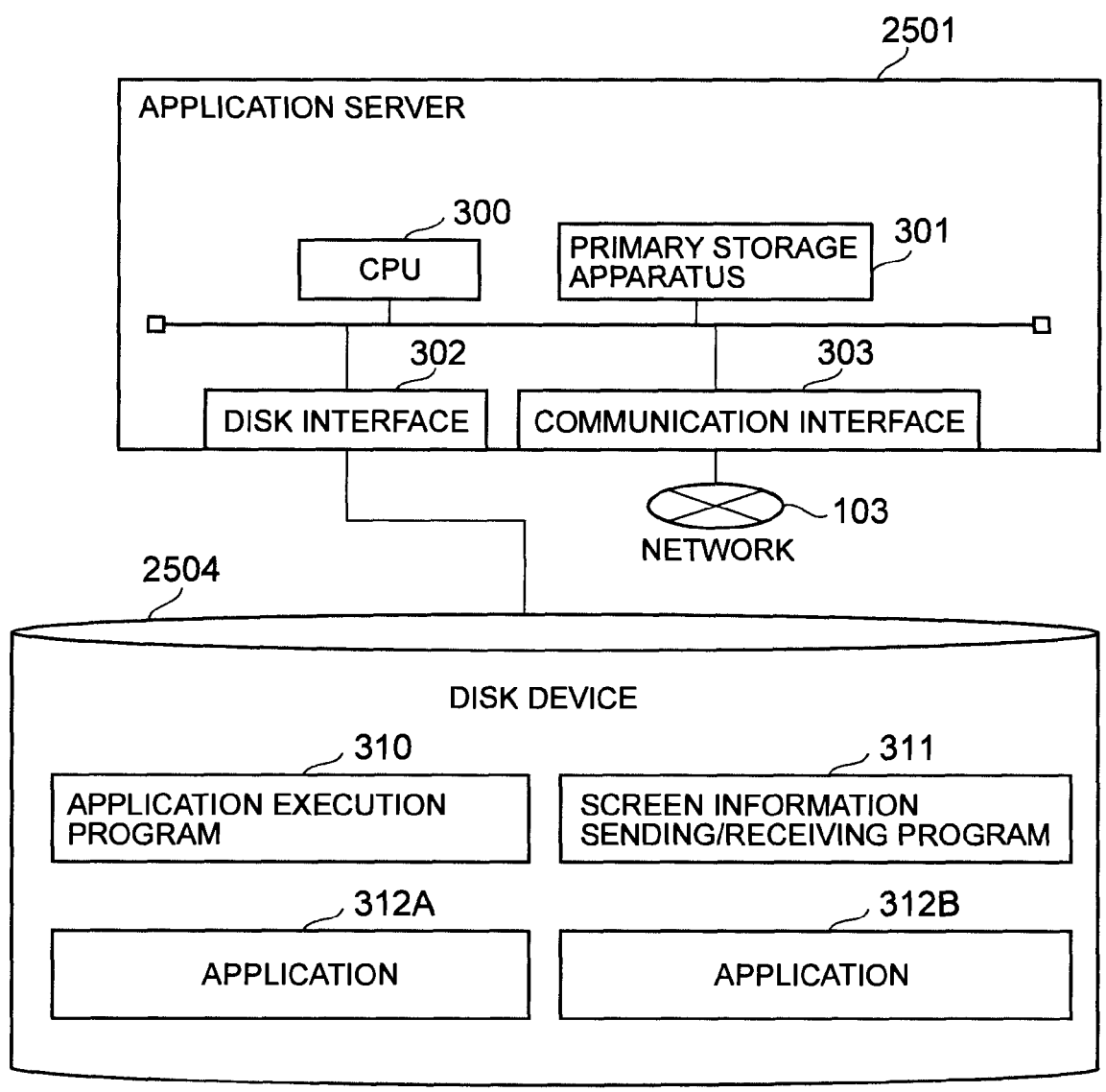
FIG. 25 is a diagram showing the configuration of an application server 2501 related to a second embodiment.
Figure 26:
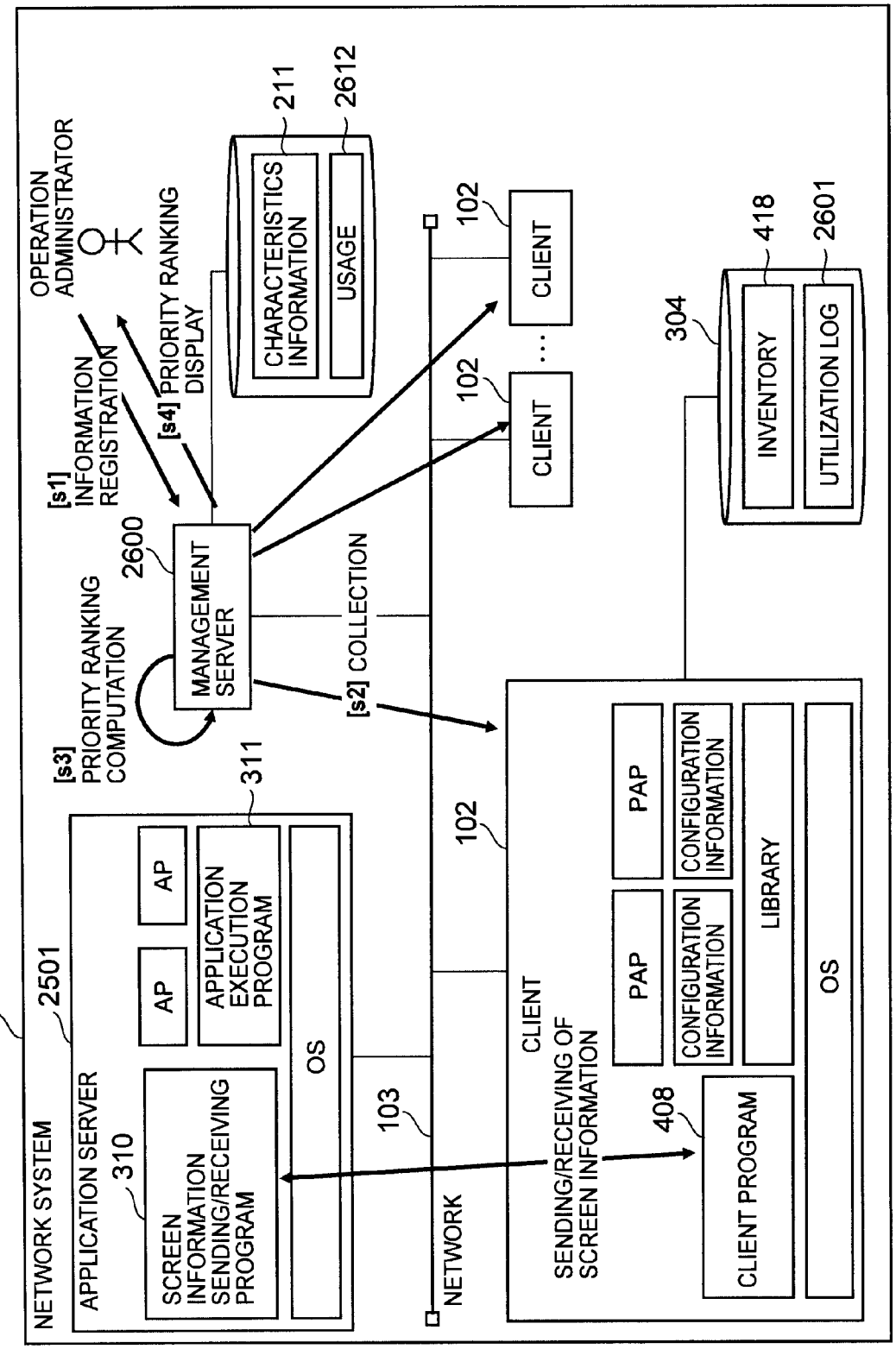
FIG. 26 is a diagram illustrating an overview of the second embodiment.

FIG. 25 is a diagram showing the configuration of an application server 2501 in this embodiment.

The application server 2501 of the second embodiment differs from that of the first embodiment in that the application is not delivered to the client 102, but rather the application is executed on the OS of the application server 101 and the screen information is sent to and received from the client 102. Therefore, the configuration of the program and data stored in a disk device 2504 is different.

The disk device 2504 is the same storage device as the disk device 304 of the first embodiment, and stores an application execution program 310, a screen information sending/receiving program 311, an application 312A, and an application 312B.

The application 312A may be a physical application, or a virtual application that accords with a streaming-type application virtualization technology.

The application 312B is the same as the application 312A, and is either a physical application or a virtual application.

In this embodiment, the application is configured using two applications, i.e., the application 312A and the application 312B, but the present invention is also applicable for a configuration or one, or three or more applications.

The application execution program 310 is a program for execution either the application 312A or the application 312B, and sends the execution result to the screen information sending/receiving programs 311. Further, the application execution program 310 receives a request from the screen information sending/receiving program 311, which received from the client 102 input information (hereinafter called input information) of a screen operation that made use of an input device (for example, a mouse or a keyboard), and operates on the application in the same way as the client 102 operation.

The screen information sending/receiving program 311 receives input information from the client 102, and sends an application execution result screen (hereinafter, the response information) to the client 102.

In this embodiment, the screen information sending/receiving program 306 is in charge of interfacing with the client group, but the screen information sending/receiving program 306 and the application execution program 305 may be integrated together. Further, the screen information sending/receiving program 306 and/or the application execution program 305 may also comprises an access control function for restricting access from the client, and a log management function for storing the client access log.

FIG. 25 is a diagram showing an overview of this embodiment. Furthermore, in this drawing, application is abbreviated as "AP", and physical application is abbreviated as "PAP".

In the second embodiment, the application execution program 311 of the application server 101 executes the application, and the screen information sending/receiving program 310 sends the application response information to the client program 408 of the client 102.

[Table Configuration of Client 102]

FIG. 27 is a diagram showing a utilization log table 2601.

The point that differs from the first embodiment explained using FIG. 7 is that a network status 704 has been added.

The network status 704 is information denoting the status of the network of clients 102 when an application is in use. In the case of a state in which the client 102 is coupled to the network while an application is being executed, "online" is set as the network status 704, and in the case of a state in which the client 102 is not coupled to the network while an application is being executed, "offline" is set as the network status 704.

Furthermore, the network status 704, for example, may be acquired and set from a program that is built into the OS as standard in order to check the network coupling status.

[Management Server 2600 Table Configuration]

FIG. 28 is a diagram showing a usage table 2612.

The point that differs from the first embodiment explained using FIG. 9 is that each row of the table 2612 comprises an offline utilization rate 904.

The offline utilization rate 904 is a numerical value denoting a percentage for the state in which the network is uncoupled while an application is being used. In this embodiment, a numerical value denoting the percentage for a row in which the network status 704 is "offline" is set as the offline utilization rate 904 for the application utilization log that is stored in the utilization log table 411 of all the clients 102. According to FIG. 28, the offline utilization rate 904 of the row in which the application ID 901 is "4" is "0.30", and this shows that 30 percent of the executions of the application with the application ID 901 of "4" were carried out in a state in which the network was uncoupled.

FIG. 29 is a diagram showing an evaluation formula table 2914.

The point that differs from the first embodiment explained using FIG. 10 is the convenience 1002 value in each row of the table 2914.

In this embodiment, the status of the client network while an application is being executed is used as the evaluation formula input. In a case where the execution environment 1001 is "virtual", that is, in a case where the application is executed in the application server 101, it is not possible to use the application in the offline state, and so "0" is set as the convenience 1002. Alternatively, in a case where the execution environment 1001 is "standard", information denoting that the convenience evaluation value becomes higher the higher the offline utilization rate of the application is set as the convenience 1002. In accordance with this, in a case where the offline utilization rate is high, the suitability evaluation program 208 determines that the user convenience is higher for a physical application, which can be used independent of the network status.

Furthermore, in a case where there is no offline use, there is no difference between "virtual" and "standard" with respect to the offline utilization rate, so that the same value may be set as the convenience 1002 of "standard" and as the convenience 1002 of "virtual".

Further, in the first embodiment, in a case where the execution environment 1001 is "standard", the status of the network is not used as input in the evaluation formula, but in this embodiment, the network status is used as input. Therefore, when the targeted execution environment changes, the information constituting the evaluation formula input may also change.

FIG. 30 is a diagram showing a suitability evaluation table 3016.

The point that differs from the first embodiment explained using FIG. 12 is that, as was explained using FIG. 28, since the value of the offline utilization rate 904 is "0" in a row in which the value of the application ID 901 is either "1", "2" or "3" in the usage table 2612, the convenience 1203 value of the row in which the application ID 1201 is either "1", "2" or "3" in this table 3016 becomes "0". Alternatively, the convenience 1203 value of the row in which the value of the application ID 1201 matches "4", and the value of the execution environment 1202 matches "standard" is "30". This denotes that the application for which the value of the application ID 1201 is "4" tends to be used offline, and as such, suitability is higher for the physical application from the standpoint of user convenience.

FIG. 31 is a diagram showing an effect evaluation table 3117.

Based on the difference with the first embodiment explained using FIG. 30, the value of the convenience 1304 is "0" in a row in which the value of the application ID 1301 is either "1", "2" or "3", and the value of the convenience 1304 is "−30" in a row in which the value of the application ID 1301 is "4". This shows that an application with an application ID 1301 of "4" tends to be used offline, and as such, a physical application is suitable from the standpoint of user convenience, and the effect of changing to a virtual application will be low. Furthermore, the value of "−30" was obtained by subtracting the value "30" for the "standard" of the table 3016 of FIG. 30 from the value "0" for the "virtual" of the table 3016 of FIG. 30 for the application with the application ID of "4".

FIG. 32 is a diagram showing a change priority ranking table 3220.

Based on the difference with the first embodiment explained using FIG. 31, the fact that the application ID 1502 values of the rows in which the priority ranking 1501 is "3" and "4" have changed places differs from the first embodiment. This signifies that since the current execution environment is suitable for the application with the application ID 1502 of "4" from the standpoint of user convenience, the priority for changing the execution environment dropped.

Figure 33:
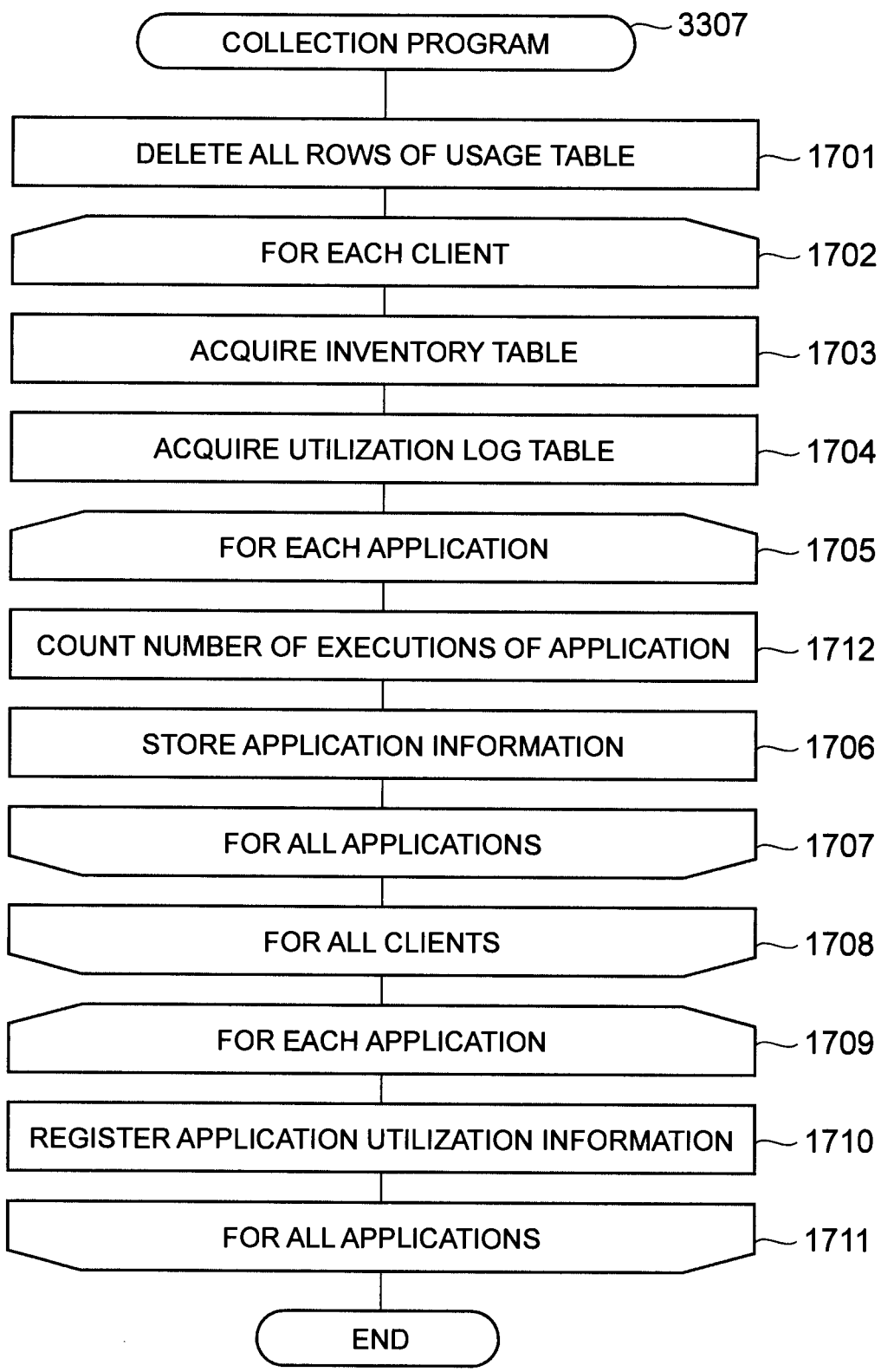
FIG. 33 is a diagram showing a collection program 3307 related to the second embodiment.

FIG. 33 is a diagram showing the processing steps of a collection program 3307.

The difference with the first embodiment explained using FIG. 17 are Step 1712, Step 1706 and Step 1710.

In Step 1712, the collection program 3307 calculates the total number of executions of each application and the number of executions when offline from the utilization log table 2601 acquired in Step 1704. The specific processing steps are as follows. Furthermore, hereinafter it is supposed that the ID 601 in the row of the inventory table 418 selected in Step 1705 is "ID33".

The collection program 3307 counts the number of rows in the utilization log table 419 acquired in Step 1704 in which the value of the application ID 701 is "ID33". It is supposed that the count value is "total number of executions 33a". Further, the collection program 3307 counts the number of rows from among these rows in which the value of the network status 704 is "offline." It is supposed that the count value is "number of offline executions 33a".

Next, the collection program 3307 stores the application information in the primary storage device 201 (Step 1706). The total number of executions and the number of offline executions are stored at this time in addition to the application name, the version, and the execution environment explained using FIG. 17. It is supposed that the stored total number of executions is "total number of executions 33" and that the stored number of offline executions is "number of offline executions 33". Furthermore, in Step 1706, in a case where application information in which the application name, the version, and the execution environment match is already stored in the primary storage device 201, "total number of executions 33a" is added to the value of the stored total number of executions, and "number of offline executions 33a" is added to the stored number of offline executions.

In the information of the current processing target application selected in Step 1709, it is supposed that the total number of executions is "total number of executions 33b" and the number of offline executions is "number of offline executions 33b".

In Step 1710, the collection program 3307 registers a new row in the usage table 212. In the new row, a value obtained by dividing the "number of offline executions 33b" by the "total number of executions 33b" is set as the offline utilization rate 904.

<Example of Evaluation Standpoint Change>

In the evaluation policy 213, information that constitutes evaluation formula input may be changed in various ways other than the method described in this embodiment. Examples of evaluation formula input information are described below for each operational management evaluation standpoint.

(D) Convenience
(d1) Application Processing Performance in Execution Environment User convenience is lost in a case where the application processing performance in the execution environment does not satisfy the processing performance required by the application. The "application processing performance in the execution environment" is the processing performance of the client 102 in the case of a physical application, and is the processing performance of the application server 2501 in the case of a virtual application. Processing performance denotes the capabilities of the computer that executes the application (for example, the CPU and primary storage device capacity), and specifically, for example, is expressed as "2.0 GHz" in the case of the CPU. In a case where the application processing performance in the execution environment satisfies the processing performance required by the application, the suitability in this execution environment can be determined as high, and in a case where the application processing performance in the execution environment does not satisfy the processing performance required by the application, the suitability in this execution environment can be determined as low. The value of the processing performance sought by the application may be stored in the characteristics table 211. The client 102 processing performance may be set in the evaluation policy 213 as a fixed value common to the clients 102, or may be stored in the client list table 221 as a value for each client 102. In accordance with this, the agent program 407 of the client 102 may use a standard program embedded in the OS to collect the processing performance of the client 102, and the collection program 3307 may acquire this information from the agent program 407 of each client 102. The processing performance of the application server 2501 may be set in the evaluation policy 213 as a fixed value that is a function of the execution environment. Further, information may also be acquired from the application server 2501. The suitability evaluation program 208, based on the evaluation policy 213, compares the processing performance required by the application to the application processing performance in the execution environment, and in a case where the processing performance required by the application is being satisfied, may determine suitability as high, and in a case where it is not being satisfied, may determine suitability as low.

(d2) Application Simultaneous Executability

Even in a case where it is preferable that the application be executed by the server, user convenience will be low in a case where the simultaneous execution of the application by a plurality of user is not assumed for a method which installs a physical application in the server because the plurality of users will not be able to use the application simultaneously. Even in the case of an application like this, a virtual application that accords with host-type application virtualization technology is deemed suitable. Application simultaneous executability may be stored in the characteristics table 211. Further, whether or not the application server 2501 comprises a function for handling an application for which simultaneous execution is not assumed may be set in the evaluation policy 213 as a value that is a function of the execution environment. The suitability evaluation program 208, based on the evaluation policy 213, is able to determine the suitability of the virtual application as being high in a case where the application lacks simultaneous executability but the application server 2501 comprises the above-mentioned function (the function for handling an application for which simultaneous execution is not assumed).

(E) Security
(e1) Data Storage Environment

In a case where the application handles secret information of one sort or another as data, the security risk is deemed high when the data is distributed to the client (especially a mobile terminal, such as a notebook PC). For an application like this, the centralized management by the application server 2501 is deemed suitable. The value of a data storage environment may be set in the evaluation policy 213 as a value that is a function of the application execution environment. For example, a value such that the suitability of the physical application is determined as low and the suitability of the virtual application is determined as high may be set as the value of the data storage environment. In addition, whether or not an application handles secret information as data will differ in accordance with the application, and as such, the secrecy or lack of said of the data being handled may be stored in the characteristics table 211. In accordance with this, it is possible to determine whether or not an application handles secret information as data on a by application basis. For example, in the case of a map, dictionary or other such application, secret information is not handled, but since the likelihood of handling secret information is high in the case of an application that handles e-mail messages and documents, the suitability of the virtual application is determined as being high.

Furthermore, an example of the storage destination of the value prepared in accordance with the above-described change example is given in the above explanation, but this storage destination value is not limited to the above explanation. For example, the value of the processing performance required by the application may be set in different information instead of being set in the characteristics table 211.

(Effects of this Embodiment)

According to this embodiment, in a network system 2610 in which a physical environment and a host-type virtual environment coexist, the suitability of the application in the respective execution environments is evaluated based on the operational management evaluation standpoints, and the priority ranking of the application for which the execution environment will be changed and the effect of this execution environment change are displayed. In accordance with this, the administrator is able to select an appropriate execution environment for the application.

Now then, in this embodiment, a network system 2610 that comprises a host-type virtual environment has been explained, but a streaming-type virtual environment may exist in this network system 2610. That is, the first embodiment and the second embodiment may be combined. In accordance with this, for example, it is possible to use the utilization log table 2601 and the usage table 2612 in evaluating the suitability of an application execution environment in a network system in which the streaming-type virtual environment and the host-type virtual environment coexist. Further, in a combination of the first embodiment and the second embodiment, an evaluation formula table will comprise both the information that is stored in the evaluation formula table 214 shown in FIG. 10 and the information that is stored in the evaluation formula table 2914 shown in FIG. 29. Also, it is possible to use at least one of the plurality of examples explained in the first embodiment and the plurality of examples explained in the second embodiment as the "evaluation standpoint change example". Further, in the combination of the first embodiment and the second embodiment, there are three application execution environments, i.e., "standard" "virtual (streaming type)" and "virtual (host type)", and for this reason, for example, in a case where the current execution environment is the "virtual (streaming type)" for a certain application (hereinafter referred to as the "target application in this section), in addition to evaluating the effect of changing from the "virtual (streaming type)" to the "standard", the effect of changing from the "virtual (streaming type)" to the "virtual (host type)" is also evaluated. Specifically, an evaluation value on each evaluation standpoint is calculated by the suitability evaluation system 208 for each of the "standard", the "virtual (streaming type)" and the "virtual (host type)", and the effect (difference in the evaluation values) of changing from the "virtual (streaming type)" to the "standard" and the effect (difference in the evaluation values) of changing from the "virtual (streaming type)" to the "virtual (host type)" is calculated by the effect evaluation system 209 for each evaluation standpoint. These results are displayed on the priority ranking list screen.

Further, in the combination of the first embodiment and the second embodiment, either an evaluation formula or a value, which is based on both the offline utilization rate and whether or not the client comprises an OS that corresponds to the support OS, may be used as the convenience 1002 inside the evaluation formula table corresponding to the execution environment "standard".

Furthermore, as a case in which the suitability of the "virtual (host type)" is higher than that of the "virtual (streaming type)" could be a case in which the processing performance required by the application is not satisfied by the client but is satisfied by the application server. A case in which the data handled by the application comprises secret information, and from the standpoint of security, it is preferable that the application be managed by the application server is also conceivable.

By contrast, as a case in which the suitability of the "virtual (streaming type)" is higher than that of the "virtual (host type)" could be a case in which the processing performance required by the application is not satisfied by the application server but is satisfied by the client. Another conceivable case is one in which the client is a notebook PC that is used in the offline mode.

[Embodiment 3]

Next, a third embodiment of the present invention will be explained.

The third embodiment is in addition to the first embodiment, and evaluates the suitability of the application in the respective execution environment based on billing information, such as a license fee determined for each application and execution environment.

FIG. 34 is a diagram showing a billing information table 224 of this embodiment.

This table 224, for example, is stored in the disk device 205 of the management sever 100. This table 224 comprises information related to a license fee charged when using the application in the respective execution environments. Specifically, each row of the table 224 comprises an application ID 3401, a standard 3402, and a virtual 3403, and corresponds to a single application.

The application ID 3401 is information for uniquely specifying an application that is being used on the network system 10, and, for example, is set with a value that is the same as the value of the ID 801 of the characteristics table 211 of FIG. 8.

The standard 3402 and the virtual 3403 are numerical values denoting the license fee for each execution environment. The standard 3402 is the license fee charged when a physical application is installed in the client 102, and the virtual 3403 is the license fee charged when a virtual application is either installed in the application server 101 or delivered to the client 102.

According to the example of FIG. 34, it is clear that for the application with the application ID 3401 of "1", a license fee of 10,000 yen per CPU 1 core is required in the case of a physical environment, and a license fee of 50,000 yen is required for every 1,000 users of the number of users that make use of simultaneous execution in the case of a virtual environment. Alternatively, it is clear that a license fee is not charged for either execution environment for the application with the application ID 3401 of "2".

The information of the billing information table 224 is used when evaluating the operation cost by taking into account a license fee charged at the time the application is used.

For example, the evaluation formula of the operation cost 1004 in the evaluation formula table 214 may be respectively expressed as follows for the execution environments 1001 "standard" and "virtual", making it possible to evaluate an operation cost that fits each execution environment.

In the case of "standard":

$$\$standard@billing\ information\ table \times \$number\ of\ users@usage\ table$$

In the case of "virtual":

$$\$virtual@billing\ information\ table \times \$number\ of\ simultaneous\ execution\ users@usage\ table$$

In the above evaluation formula, it is supposed that the "$number of simultaneous execution users@usage table" represents the total number of users who used the application simultaneously during a certain time period, and that a column for the "number of simultaneous execution users" is provided in the usage table 212. The collection program 207 explained using FIG. 17 is able to calculate the maximum value of the total number of users that utilized the application during the same time period based on the information of the utilization log table 419 acquired in Step 1704, and to set this maximum value as the value of the "number of simultaneous execution users".

(Effects of this Embodiment)

According to this embodiment, it is possible to reflect the difference in license fees that differ in accordance with the application execution environment in the evaluation of the operation cost, thereby enhancing the potential for more appropriately selecting the application execution environment.

Furthermore, a license fee was given as an example in this embodiment, but it is also possible to consider other types of costs that differ in accordance with the application execution environment either instead of or in addition to the license fee. For example, a variable related to another type of cost may be included in the evaluation formula for the operation cost. Also, either a formula or value based on at least one of the execution environment-based billing system and the number of application users may be used as the operation cost 1004.

[Embodiment 4]

Next, a fourth embodiment of the present invention will be explained.

The fourth embodiment relates to a network system that utilizes one or more cloud systems.

Figure 35:
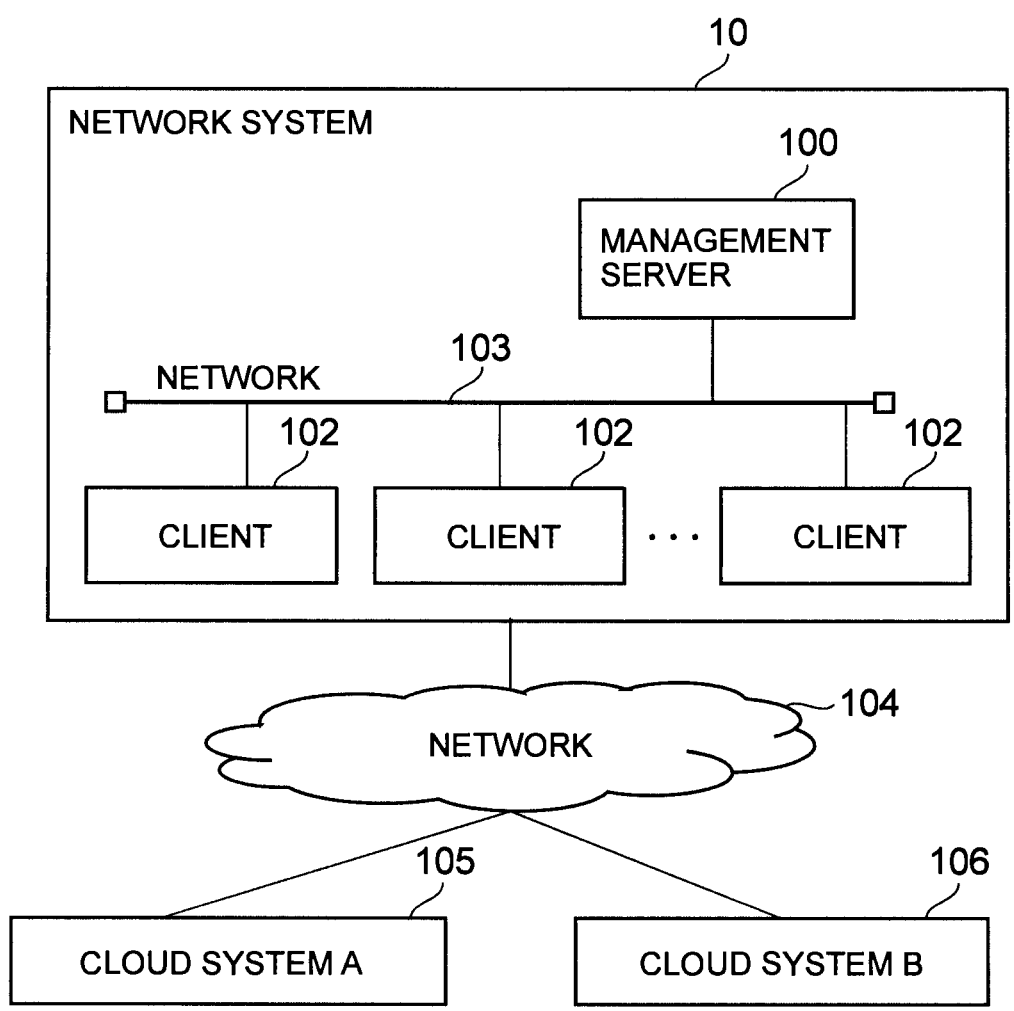
FIG. 35 is a diagram showing the overall configuration of a fourth embodiment.

FIG. 35 is a diagram showing the overall configuration of this embodiment.

A cloud system group comprising cloud system A105 and cloud system B106 is coupled to the network system 10 via a second network 104. Hereinafter, when arbitrarily specifying either the cloud system A105 or the cloud system B106 of the cloud system group, it will simply be called the "cloud system".

The second network 104 is a communication network (for example, the Internet, a LAN or a WAN) communicably coupling together the network system 10 and the cloud system group.

The cloud system A105 and the cloud system B106 are systems for providing as a service via the network functions equivalent to the applications that is being used on the network system 10. Hereinafter, a service provided by a cloud system will be called the "cloud service." The cloud system carries out billing with respect to the network system 10 in accordance with cloud service usage. In this embodiment, it is supposed that the billing is done in accordance with the number of users, that 3,000 yen per month per user is billed in the case of the cloud system A105, and that 7,000 yen per month per user is billed in the case of the cloud system B106. The billing method may be either a flat-rate billing system, in which fixed billing is done in accordance with the number of users as in this embodiment, or pay-as-you-go billing system, in which billing is done in accordance with the cloud service utilization quantity, such as the utilization time and amount of stored data. In addition, the present invention is also applicable in a case where the cloud system does not perform billing.

Furthermore, in this embodiment, the rate of operation will differ in accordance with the cloud system. The "rate of operation" is a value that quantitatively shows the availability of the cloud system, and denotes the percentage of time within a fixed time that the cloud system is functioning. It is supposed that the rate of operation for the cloud system A105 is 0.96, and that the rate of operation of the cloud system B105 is 0.99. The information on the rate of operation of the cloud system, for example, may be use information disclosed by the cloud service user on the Web or the like.

In this embodiment, it is supposed that the fee is low and reliability from the standpoints of availability and security is low for the cloud system A105, and that the fee is high and reliability from the standpoints of availability and security is high for the cloud system B106.

The client 102 uses the cloud service via the second network 104.

Further, in this embodiment, it is supposed that the cloud service provides functions equivalent to all the applications used on the network system 10 using the same billing system, but the applications provided by the cloud service and the billing system may be different.

FIG. 36 is a diagram showing a usage table 3612 of this embodiment.

The difference with the usage table 212 explained using FIG. 9 is that each row of the table 3612 comprises a utilization rate 903.

The utilization rate 903 is a numerical value denoting the percentage of application utilization time for all the clients with respect to the operating period of the network system 10. That is, the utilization rate 903 quantitatively shows how frequently this application is being used.

FIG. 37 is a table showing an evaluation formula table 3714 of this embodiment.

The difference with the evaluation formula table 214 explained using FIG. 10 is that "cloud A" and "cloud B" have been added as the execution environment 1001. "Cloud A" denotes that the cloud service of the cloud system A105 will be used as the application execution environment, and "cloud B" denotes that the cloud service of the cloud system B106 will be used as the application execution environment.

The convenience 1002 of the execution environment "cloud A" ("cloud B") is the evaluation formula for calculating the evaluation value corresponding to the rate of operation of the cloud system A (cloud system B) and the utilization rate of the application. According to this evaluation formula, because there is a low likelihood of the cloud system shutting down when using the application the higher the application utilization rate becomes, the suitability is determined as being low. Further, according to the evaluation formulas for "cloud A" and "cloud B", the rate of operation of the cloud system A105 is lower than the rate of operation of cloud system B106, and there is a high likelihood of cloud system A shutting down in a case where the application utilization rate is the same. For this reason, there are instances in which the suitability in the cloud system A is determined as being low even when the application utilization rate is the same.

Furthermore, the application utilization rate may be acquired from the utilization rate 903 of the usage table 212. In the case of a physical application, since this application is able to be used as long as the client 102 does not physically malfunction and a logical failure does not occur in the application, in this embodiment, "100" (for example, the maximum value) is set as the convenience 1002 of the execution environment "standard".

A fixed value that is a function of the characteristics of the cloud system is set as the security 1003. In this embodiment, since the reliability of the cloud system A105 from the standpoint of security is low, a value denoting low suitability is set, and since the reliability of the cloud system B106 from the standpoint of security is high, a value denoting high suitability is set. In this embodiment, a fixed value that is a function of the cloud system is set as the security 1003, but as was explained in the second embodiment, an evaluation formula for evaluating the suitability in accordance with the secrecy of the data handled by the application may also be set.

As the operation cost 1004 of execution environments 1001 "cloud A" and "cloud B", an evaluation formula for calculating a value in accordance with the number of users of an application and the cloud system billing amount is set. This is because the operation cost changes in accordance with the cloud service used since each cloud service is billed in accordance with the number of users. Information related to the charge for each cloud system, for example, may be registered in a billing information table 224 as was explained in the third embodiment. In a case where the execution environment 1001 is "standard", a per-user billing amount is set when the application is installed in the client 102 as was explained in the third embodiment, making it possible to calculate a value obtained by multiplying the billing amount and the number of user in the evaluation formula.

According to this embodiment, it is possible to evaluate the execution environment by taking into account the application utilization rate, the rate of operation of the cloud service, and the billing system.

<Example of Evaluation Standpoint Change>

In the evaluation policy 213, the information constituting the input of the evaluation formula may be changed in various ways other than those explained in this embodiment. Examples of evaluation formula input information will be described below for each operational management evaluation standpoint.

(F) Operation Cost (f1) Network Traffic, Data Amounts, Utilization Time

In a case where the cloud service is billed for in accordance with the network traffic, the amount of data stored in the cloud system, and the time that the cloud service is utilized, it is possible to evaluate the suitability with respect to the operation cost based on each of the application network traffic, the amount of stored data, and the application utilization time. The network traffic for the data used by the application, the amount of data, and the utilization time may be stored in the usage tale 212. In the evaluation policy 213, the suitability evaluation program 208 evaluates the operation cost required to use the cloud service based on this information and the cloud service billing system. In a case where the operation cost is high, the suitability in the cloud service may be determined as being low.

Further, the present invention is also applicable even for other resources, such as the number of servers, besides the data amount and the network traffic.

Furthermore, the present invention, in addition to supporting the migration of an application between the network system 10 and a cloud system, may also be applied to the migration of an application between cloud systems, and is able to select the optimum cloud system for providing the functions of respective applications based on the rate of operation and billing system of each cloud system. In accordance with this, information regarding application usage is acquired from the cloud system.

Further, in this embodiment, an example in which a physical application is installed in client 102 was given, but, for example, the present invention is also applicable for an application such as an in-house work management system or Web system. In accordance with this, characteristics information, such as the specification that the administrator requires for this system and allowable downtime, are inputted into the characteristics table 211. Information, such as the number of user utilizing this system and the amount of data stored in this system, may be acquired from this system and set in the usage table 212. In accordance with this, it becomes possible to compare this system inside the network system 10 to this system on the cloud service, and to select a more appropriate execution environment.

(Effects of this Embodiment)

According to this embodiment, the suitability of an application in respective execution environments in a network system that makes use of one or more cloud systems is evaluated based on operational management evaluation standpoints, and the priority of an application for which the execution environment will be changed, and the effect of this change are displayed. In accordance with this, the administrator is able to select the appropriate execution environment for the application.

[Embodiment 5]

Next, a fifth embodiment of the present invention will be explained.

In the fifth embodiment, a priority ranking list screen differs from the priority ranking list screen 2200 of the first through the fourth embodiments.

Figure 38:
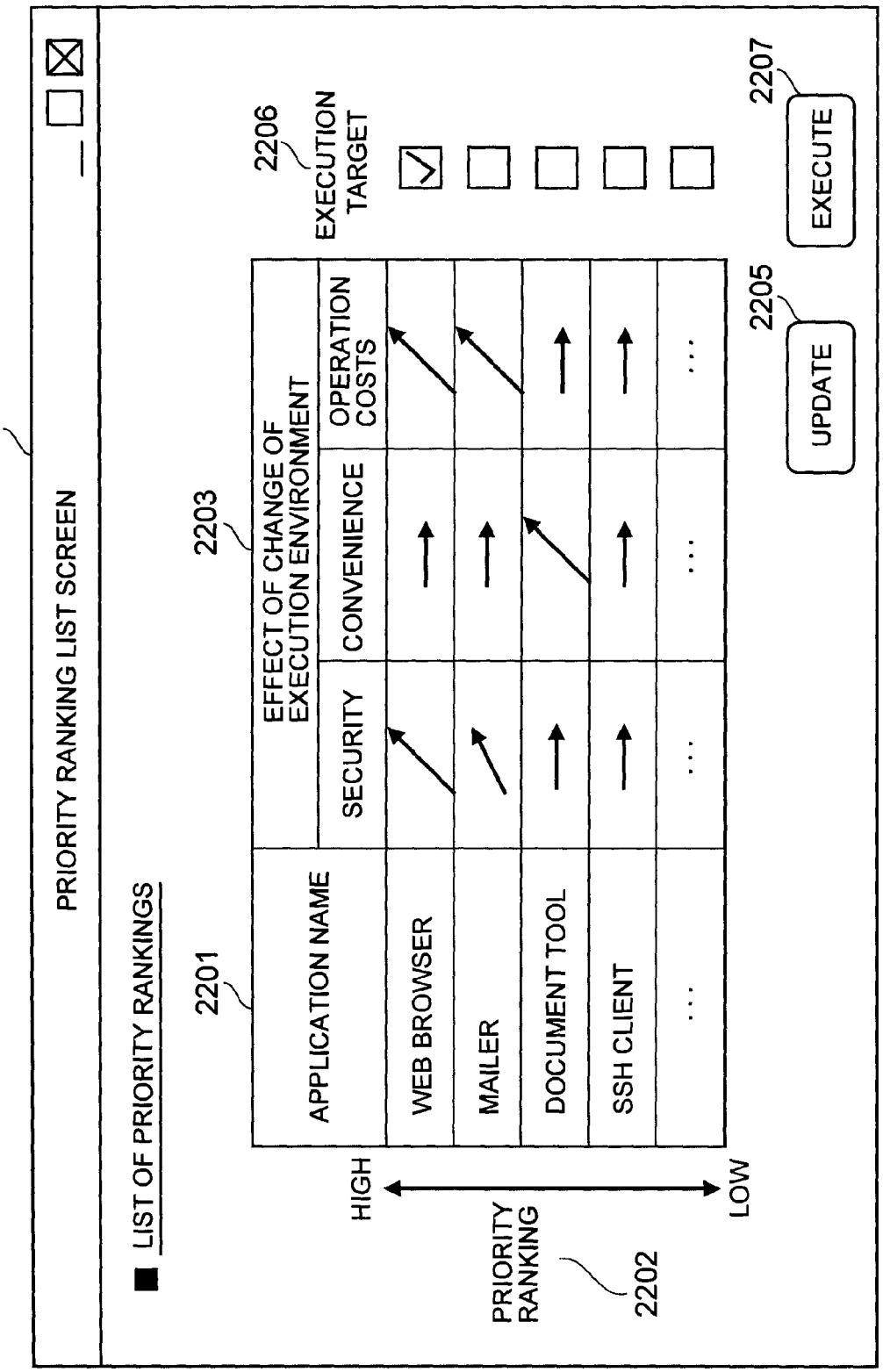
FIG. 38 is a diagram showing a priority ranking list screen 3800 related to a fifth embodiment.

FIG. 38 is a diagram showing the priority ranking list screen 3800 of this embodiment.

The difference with the priority ranking list screen 2200 explained using FIG. 22 is that a migration target checkbox 2206 and a migration button 2207 have been provided.

The migration target checkbox 2206 is for selecting an application for which the execution environment will be changed from among the applications displayed in the priority ranking list screen 2200. A method other than using a checkbox may be used as the method for selecting the application (For example, a method in which the application ID is inputted may be used.).

The migration button 2207 is for changing the execution environment of the application selected using the migration target checkbox 2206. In a case where the migration button 2207 has been pressed, the management server (for example, the change environment program is executed by the CPU inside the management server) changes the application execution environment. Specifically, for example, the management server 100 automatically transfers to the cloud service the client application and data by executing a predetermined program. In accordance with this, for example, a migration is carried out from the "standard" to a "cloud environment".

(Effects of this Embodiment)

According to this embodiment, the administrator is able to reference the priority ranking list screen 3800 and change the execution environment simply by selecting the application for which the execution environment will be changed in accordance with the displayed priority ranking. For this reason, a reduction in the cost that it takes to migrate the application can be expected.

[Embodiment 6]

Next, a sixth embodiment of the present invention will be explained.

In the sixth embodiment, a condition for narrowing down the evaluation target applications is provided. Application suitability is not evaluated for an application that does not conform to this condition. The condition, for example, is configured using a threshold that corresponds to one or more types of application information (for example, the number of users).

FIG. 39 is a diagram showing a threshold table 225 of this embodiment.

This table 225, for example, is stored in the management server disk device, and specifically, for example, is included in the evaluation policy 213. Each row of this table 225 comprises an execution environment 3901 and a condition formula 3902, and corresponds to a single execution environment.

The execution environment 3901 is information denoting the execution environment of the application. The value that is set, for example, is the same value as that of the execution environment 604 of the inventory table 418 of FIG. 6.

The condition formula 3902 is information denoting a condition formula for expressing whether or not the suitability of the application execution environment 3901 will be evaluated. In a case where the condition formula is satisfied, the application suitability is evaluated, and in a case where the condition formula is not satisfied, the application suitability is not evaluated. That is, in a case where the condition is not satisfied, the priority ranking of the change to this application execution environment is not displayed on the priority ranking list screen 2200.

In this embodiment, in a case where the value of the execution environment 3901 is "virtual", the virtualizability of the application, the number of users or expected utilization time, the last time utilized, and the presence or absence of related applications are set as the condition, and suitability will be evaluated only in a case where the application is one which is capable of being made into a virtual application, has 1,000 or more users, has a utilization log that is less than six months, and is not linked to any other application. This indicates that it is completely meaningless to evaluate the suitability in a case where the application is unable to be made into a virtual application, a case where the number of users is too few or there is no cost-merit in migrating an application with a low utilization frequency, or a case where a linked application eliminates the possibility of changing the execution environment. Therefore, the above-mentioned condition formula can be one that corresponds to an application for which there is no need to evaluate suitability.

Information denoting virtualizability may be set in the characteristics table 211. The number of users, the last time utilized, and the presence or absence of a related application may be set in the usage table 212. As for the presence or absence of a related application, the agent program 407 of the client 102 is able to monitor the communication status, such as communications between processes inside the client 102 and HTTP communications to detect the presence or absence of a linked application, and is also able to detect the presence or absence of a linked application from the application setting information. Examples of application in which inter-application links are performed include an Integrated Development Environment (IDE), a Web server, and a database server.

In this embodiment, the above-described condition formula is used, but change is also possible using a condition formula other that the one described above.

Further, "user name" and "last time used" are described in the condition formula 3902 without table information, but it is also possible to describe the column name and table name as "$<column name>@<table name>", which was clearly explained using FIG. 18.

For the same of simplicity, a plurality of formulas are collectively described in the condition formula 3902, but these plurality of formulas may be normalized and made into separate tables.

Further, as was explained using FIGS. 10 and 11, it is supposed that the evaluation policy 213 is stored in the management server 100 beforehand, but the administrator may input this policy 213.

Figure 40:
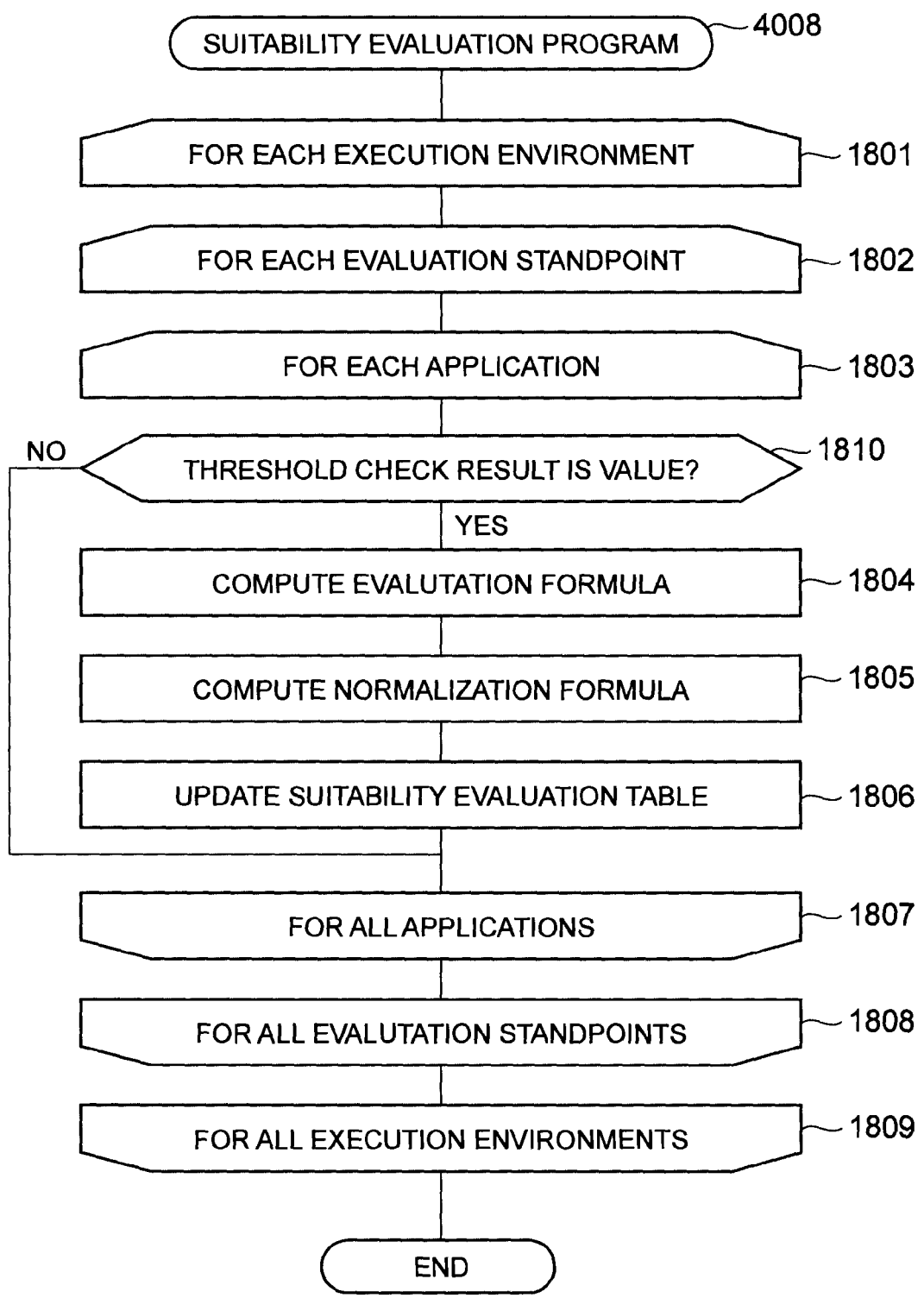
FIG. 40 is a diagram showing the processing steps of a suitability evaluation program 4008 related to the sixth embodiment.

FIG. 40 is a diagram showing the processing steps of a suitability evaluation program 4008 of this embodiment.

The point that differs from the first embodiment explained using FIG. 18 is the fact that a determination is made as to whether or not to evaluate the application suitability based on the threshold table 225 in Step 1810. This difference will be explained in detail below.

In Step 1810, the condition formula 3902 of the row, in which the value of the execution environment 3901 of the threshold table 225 matches with "execution environment 18", is evaluated. In a case where the result of the evaluation is true, processing transitions to Step 1804. In a case where the result of the evaluation is false, processing transitions to Step 1807, and the processing target shifts to the next application.

(Effects of this Embodiment)

According to this embodiment, the application for which suitability is evaluated is limited. For example, suitability is not evaluated for an application for which the need to change execution environments is low. As a result of this, the information (application selections) displayed on the priority ranking list screen 2200 is focused. For this reason, the administrator is able to reduce the burden required to determine whether or not to migrate an application.

The preceding has been explanations of a number of embodiments of the present invention, but needless to say the present invention is not limited to these embodiments, and a variety of changes are possible without departing from the gist thereof.

For example, the effect of changing the execution environment is displayed in all of the embodiments described above, but either instead of or in addition to the effect of changing the execution environment, an evaluation value (for example, the evaluation value of each evaluation standpoint) that shows the suitability for each type of execution environment may be displayed.

Further, the priority of the evaluation standpoint does not always have to be used to calculate the priority ranking (application priority ranking) of the candidates for an execution environment change.

Further, for example, the fact that it is possible to combine the first and second embodiments was explained above, but the present invention is not limited to this, and it is possible to combine any two or more embodiments from among the first through the sixth embodiments. For this reason, it is possible for four types of execution environments, i.e., the physical environment, the virtual environment (streaming type), the virtual environment (host type), and one or more cloud environments, to coexist in a single network system. In a case where there are two or more types of execution environments, the number of types may be more or less than four. In a case where the number of types of execution environments is N (N being an integer of 2 or larger), the change effects of (N−1) types are evaluated for one application by the effect evaluation program. For example, in a case where there are four types of execution environments, i.e., X1, X2, X3 and X4, and the current execution environment is X1, the change effects of three types (the respective effects for changes from X1 to X2, from X1 to X3, and from X1 to X4) are evaluated by the management server. Each change effect comprises a change effect evaluation value (for example, the respective values for evaluation standpoints 1304 through 1306 of FIG. 13) for each evaluation standpoint. Furthermore, at least one change effect may comprise a total evaluation value (for example, the total of the plurality of change effect evaluation values) calculated based on the change effect evaluation values that accord with the plurality of evaluation standpoints.

Further, in a case where the above-described fifth embodiment is combined with one or more other embodiments, a change will be carried out from the one execution environment to the other execution environment. Any of the physical environment, the virtual environment (streaming type), the virtual environment (host type), and the cloud environment may be used as the execution environment. For example, in the case of a change from the physical environment to the virtual environment (streaming type), the management server may execute uninstall for the physical application in the client 102, and deliver to the client 102 from the application server a virtual application comprising an application program that is executed as the physical application. In this way, the management server is able to execute a process in accordance with what execution environment was changed to what other execution environment.

Further, for example, according to the above explanation, the suitability of an application in a certain execution environment is evaluated, but it is also possible for the suitability of the type of the application to be evaluated from a different standpoint. Specifically, for example, the suitability evaluation program calculates for a certain application (hereinafter referred to as "application T") an evaluation value (for example, an evaluation value for each evaluation standpoint) denoting the suitability for each application type. The application types include at least two from among "physical type", which signifies a physical application, "virtual type S", which signifies a virtual application that conforms to the streaming-type application virtualization technology, "virtual type H", which signifies a virtual application that conforms to the host-type application virtualization technology, and "cloud type", which signifies an application that is executed by a cloud system. The effect evaluation program calculates for application T the difference between the evaluation value of the current application type (for example, the physical type) and the evaluation value of one or more other application types (for example, the virtual type S). The effect that conforms to this difference (for example, the orientation (angle) of the arrow) is displayed.

Reference Signs List

100 Management server

The invention claimed is:

1. An evaluation system comprising:
   a communication interface device, which is coupled to a network that is coupled to a client; and
   a controller, comprising at least one computer coupled to the communication interface device,
   wherein the controller is configured to:
   (A) evaluate the suitability of an application in a plurality of types of application execution environments, based on characteristics of the application used by a user of the client and/or a usage of the application by the user, and
(B) display information denoting the result of the evaluation in (A);
wherein the controller is configured to evaluate the suitability of a type of the application from among a plurality of application types as an evaluation of the suitability of the application in a plurality of types of application execution environments,
wherein the application type comprises a physical type which signifies an application that is installed and executed in a client, a virtual type S which signifies a virtual application that conforms to an application virtualization technology in which an application delivered from an application server is executed in a client environment that isolates access by the application to a native resource provided by an OS, and a virtual type H which signifies a virtual application that conforms to an application virtualization technology in which an application is executed by a client remotely on an application server,
wherein the application is executed on the client in a case where the application type is the physical type,
wherein the client is configured to receive the application from an application server and the application is executed on the client in a case where the application type is the virtual type S,
wherein the application is executed on the application server in a case where the application type is the virtual type H,
wherein the client is configured to manage utilization log information, which is information denoting a utilization log of the application, and application information which is information related to the application,
wherein the application characteristics comprise a version, a number of patches, and a support OS,
wherein the application usage comprises a current type of the application, a number of users of the application, and an offline utilization rate which denotes how much the application has been utilized offline,
wherein the controller is configured to manage an evaluation policy,
wherein the evaluation policy includes either a formula or a value for a plurality of evaluation standpoints for each application type,
wherein the evaluation standpoint comprises a user convenience, a security, and a cost,
wherein the formula or value corresponding to the user convenience is either a formula or a value which is based on at least one of the application offline utilization rate and whether or not the client comprises an OS that corresponds to the support OS,
wherein the formula or value corresponding to the security is either a formula or a value which is based on at least one of a number of patches of the application and a number of users of the application,
wherein the cost is a value based on a number of users of the application,
wherein, in (A), the controller is configured to:
(a1) acquire, from the client, information comprising the application information and the utilization log information;
(a2) learn the application characteristics and the application usage from the acquired intonation;
(a3) calculate, based on the evaluation policy and the application characteristics and usage, an evaluation value denoting the suitability of each application type of the application for each evaluation standpoint; and
(a4) calculate the difference between an evaluation value for each evaluation standpoint for a current application type and an evaluation value for each evaluation standpoint for one or more different application types, and
wherein, in (B), the controller is configured to display, based on the difference calculated in (a4), an effect of changing the application type of the application from the current application type to the one or more different application types.

2. An evaluation system according to claim 1,
wherein, in (A), the controller is configured to calculate a priority ranking for a type change candidate based on a priority of the user convenience, the security and the cost, and the evaluation value calculated in (a3), and in (B), the controller is configured to line up and display a plurality of type change candidates in descending order of the priority ranking of the type change candidates, and
wherein the type change candidate is defined by an application, the current application type of this application, and the post-change application type of this application.

3. An evaluation system according to claim 2,
wherein, in the evaluation policy:
(U1) the formula or value of the user convenience corresponding to the physical type is either a formula or a value which is based on a number of clients that have an OS corresponding to a support OS;
(U2) the formula or value of the user convenience corresponding to the virtual type S is either a formula or a value which is independent of the number of clients that have an OS corresponding to the support OS;
(U3) the formula or value of the user convenience corresponding to the virtual type H is either a formula or a value which is independent of the offline utilization rate of the application;
(S1) the formula or value of the security corresponding to the physical type is either a formula or a value which is based on both the number of patches and the number of users of the application;
(S2) the formula or value of the security corresponding to the virtual type S is either a formula or a value which is based on the number of users of the application and is independent of the number of patches of the application;
(S3) the formula or value of the security corresponding to the virtual type H is either a formula or a value which is based on the number of users of the application and is independent of the number of patches of the application;
(C1) the formula or value of the cost corresponding to the physical type is either a formula or a value which is based on the number of users of the application;
(C2) the formula or value of the cost corresponding to the virtual type S is either a formula or a value which is independent of the number of users of the application; and
(C3) the formula or value of the cost corresponding to the virtual type H is either a formula or a value which is independent of the number of users of the application, and
wherein, regarding the evaluation value calculated in (a3):
(u1) in a case where there are numerous clients that have an OS corresponding to the support OS, the evaluation values for the physical type and the user convenience are high, and in a case where there are few clients that have an OS corresponding to the support OS, the evaluation values for the physical type and the user convenience are low;

(s1) in a case where the number of patches of the application is numerous, the evaluation value for the security is low, and in a case where the number of patches of the application is few, the evaluation value for the security is high;

(s2) in a case where the number of users of the application is numerous, the evaluation values for the security and the physical type are low, and in a case where the number of users of the application is few, the evaluation values for the security and the physical type are high; and (c1) in a case where the number of users of the application is numerous, the evaluation values for the cost and the physical type are low, and in a case where the number of users of the application is few, the evaluation values for the cost and the physical type are high.

4. An evaluation system according to claim 2, wherein the controller is configured to execute (a3) and (a4) for an application of a plurality of applications, exclusive of an application that meets a condition signifying that there is no need to evaluate the suitability of the type of the application.

* * * * *